United States Patent
Kocienda et al.

(10) Patent No.: US 9,355,472 B2
(45) Date of Patent: *May 31, 2016

(54) DEVICE, METHOD, AND GRAPHICAL USER INTERFACE FOR ADJUSTING THE APPEARANCE OF A CONTROL

(71) Applicant: Apple Inc., Cupertino, CA (US)

(72) Inventors: Kenneth L. Kocienda, San Jose, CA (US); Tiffany S. Jon, Cupertino, CA (US); Chanaka G. Karunamuni, San Jose, CA (US)

(73) Assignee: APPLE INC., Cupertino, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/183,369

(22) Filed: Feb. 18, 2014

(65) Prior Publication Data

US 2014/0267362 A1 Sep. 18, 2014

Related U.S. Application Data

(60) Provisional application No. 61/832,952, filed on Jun. 9, 2013, provisional application No. 61/801,988, filed on Mar. 15, 2013.

(51) Int. Cl.

| G06T 11/00 | (2006.01) |
|---|---|
| G06T 5/00 | (2006.01) |
| G06T 11/60 | (2006.01) |
| G06T 3/40 | (2006.01) |
| G06T 5/40 | (2006.01) |
| G06F 3/048 | (2013.01) |
| G09G 5/02 | (2006.01) |

(Continued)

(52) U.S. Cl.
CPC .......... *G06T 11/001* (2013.01); *G06F 3/04847* (2013.01); *G06F 3/04886* (2013.01); *G06T 11/60* (2013.01); *G06F 2203/04804* (2013.01)

(58) Field of Classification Search
CPC combination set(s) only.
See application file for complete search history.

(56) References Cited

U.S. PATENT DOCUMENTS

| 5,805,163 A | 9/1998 | Bagnas |
| 5,831,615 A | 11/1998 | Drews et al. |

(Continued)

FOREIGN PATENT DOCUMENTS

| KR | 2005-0120343 | 12/2005 |
| KR | 20070059810 | 6/2007 |
| TW | 201246073 A1 | 11/2012 |

OTHER PUBLICATIONS

International Search Report and Written Opinion received for PCT Patent Application No. PCT/US2014/018728, mailed on Jun. 2, 2014, 10 pages.

(Continued)

*Primary Examiner* — Wesner Sajous
(74) *Attorney, Agent, or Firm* — Morgan, Lewis & Bockius LLP

(57) ABSTRACT

An electronic device with a display displays a user interface on the display. The device determines a first set of content-display values for one or more content-display properties of first content that corresponds to a respective region of the display. The device determines a first set of control-appearance values for one or more control-appearance parameters based on the first set of content-display values. The device displays a control in the respective region of the display, wherein an appearance of the control is determined based on the first content and the first set of control-appearance values.

45 Claims, 20 Drawing Sheets

(51) Int. Cl.
*G09G 5/14* (2006.01)
*G09G 3/20* (2006.01)
*G09G 3/00* (2006.01)
*H04N 1/60* (2006.01)
*H04N 5/202* (2006.01)
*G06F 3/0488* (2013.01)
*G06F 3/0484* (2013.01)
*H04N 5/57* (2006.01)

(56) References Cited

U.S. PATENT DOCUMENTS

| | | | |
|---|---|---|---|
| 6,151,030 | A | 11/2000 | DeLeeuw et al. |
| 6,954,905 | B2 | 10/2005 | Brown et al. |
| 7,739,613 | B2 | 6/2010 | Lindsay |
| 7,956,869 | B1 | 6/2011 | Gilra |
| 8,091,038 | B1 | 1/2012 | Johnson et al. |
| 8,191,003 | B2 | 5/2012 | Brown et al. |
| 8,264,499 | B1 | 9/2012 | Landry et al. |
| 8,339,413 | B2 | 12/2012 | Miller et al. |
| 8,587,596 | B2 | 11/2013 | Mejdrich et al. |
| 2003/0065590 | A1 | 4/2003 | Haeberli |
| 2003/0112253 | A1 | 6/2003 | Cazier et al. |
| 2004/0179017 | A1 | 9/2004 | Martyn et al. |
| 2006/0129933 | A1* | 6/2006 | Land .............. G11B 27/034 715/723 |
| 2006/0248557 | A1* | 11/2006 | Stark ............. H04N 21/4126 725/37 |
| 2007/0083825 | A1 | 4/2007 | Chaudhri et al. |
| 2007/0124691 | A1 | 5/2007 | Lindsay et al. |
| 2007/0124692 | A1 | 5/2007 | Lindsay et al. |
| 2007/0192718 | A1 | 8/2007 | Voorhees et al. |
| 2008/0301546 | A1 | 12/2008 | Moore et al. |
| 2009/0175411 | A1 | 7/2009 | Gudmundson et al. |
| 2010/0253697 | A1 | 10/2010 | Rivera |
| 2013/0073963 | A1* | 3/2013 | Pendergast .......... G11B 27/034 715/716 |
| 2014/0267363 | A1 | 9/2014 | Kocienda et al. |
| 2014/0362105 | A1 | 12/2014 | Kocienda et al. |

OTHER PUBLICATIONS

McCracken, Harry, "Windows Aero: Why I'm Glad It's Dead", available at <http://techland.time.com/2012/05/22/windows-aero-why-im-glad-its-dead/print/>, May 22, 2012, 3 pages.
Thecodeking, "Windows Vista Aero Glass in .NET Managed Win32 Applications", available at <http://www.codeproject.com/Articles/17681/Windows-Vista-Aero-Glass-in-NET-Managed-Win32-Appl>, Feb. 18, 2007, 7 pages.
Windows, "What is Windows Aero?", available at <http://windows.microsoft.com/en-my/windows-vista/what-is-windows-aero>, retrieved on Sep. 16, 2014, 2 pages.
Office Action, dated Sep. 25, 2015, received in Korean Patent Application No. 10-2014-0063868, which corresponds with U.S. Appl. No. 14/027,047, 5 pages.
International Search Report and Written Opinion, dated Jun. 2, 2014, received in International Patent Application No. PCT/US2014/018728, which corresponds with U.S. Appl. No. 14/183,383, 9 pages.
International Preliminary Report on Patentability, dated Sep. 15, 2015, received in International Patent Application No. PCT/US2014/018728, which corresponds with U.S. Appl. No. 14/183,383, 7 pages.
Notice of Allowance, dated Dec. 14, 2015, received in Taiwanese Patent Application No. 103119126, which corresponds with U.S. Appl. No. 14/183,383, 3 pages.
International Search Report and Written Opinion, dated Oct. 24, 2014, received in International Patent Application No. PCT/US2014/037735, which corresponds with U.S. Appl. No. 14/027,047, 13 pages.
International Preliminary Report on Patentability, dated Dec. 15, 2015, received in International Patent Application No. PCT/US2014/037735, which corresponds with U.S. Appl. No. 14/027,047, 11 pages.
Office Action, dated Sep. 14, 2015, received in Taiwanese Patent Application No. 103109466, which corresponds with U.S. Appl. No. 14/183,369, 6 pages.
Notice of Allowance, dated Sep. 16, 2015, received in U.S. Appl. No. 14/183,383, 9 pages.

* cited by examiner (B)

---

924 While displaying the control in the respective region of the display:
detect a change in content that corresponds to the respective region of the display from the first content to second content, different from the first content;
determine a second set of content-display values, different from the first set of content-display values, for the one or more content-display properties of the second content;
determine a second set of control-appearance values for one or more control-appearance parameters based on the second set of content-display values, wherein the second set of control-appearance values is different from the first set of control-appearance values; and
in response to detecting the change in content, change the appearance of the control in accordance with the second content and the second set of control-appearance values 926 Changing the appearance of the control includes changing a color of text in the control 928 The control includes a translucent portion; and
changing the appearance of the control in accordance with the second set of control-appearance values includes displaying, in the translucent portion of the control, a representation of a portion of the second content that corresponds to the translucent portion of the control, wherein the representation of the second content is transformed in accordance with the second set of control-appearance values 930 The first set of control-appearance values are values for a first set of control-appearance parameters, and the second set of control-appearance values are values for the first set of control-appearance parameters (C)

Figure 9C

924 While displaying the control in the respective region of the display:
detect a change in content that corresponds to the respective region of the display from the first content to second content, different from the first content;
determine a second set of content-display values, different from the first set of content-display values, for the one or more content-display properties of the second content;
determine a second set of control-appearance values for one or more control-appearance parameters based on the second set of content-display values, wherein the second set of control-appearance values is different from the first set of control-appearance values; and
in response to detecting the change in content, change the appearance of the control in accordance with the second content and the second set of control-appearance values 932 The first set of control-appearance values are values for a first set of control-appearance parameters, and the second set of control-appearance values are values for a second set of control-appearance parameters different from the first set of control-appearance parameters 934 After detecting the change in content that corresponds to the respective region of the display from the first content to the second content and prior to changing the appearance of the control in accordance with the second set of control display values:
determine a respective set of control-appearance values, different from the first set of control-appearance values, for the first set of control-appearance parameters based on the second set of content-display values, wherein the respective set of control appearance values is different from the first set of control-appearance values and the second set of control-appearance values; and
change the appearance of the control in accordance with the second content and the respective set of control-appearance values

Figure 9D

936 The control includes a translucent portion;
a respective portion of content corresponds to a location of the translucent portion of the control; and
displaying the control in accordance with a respective set of control-adjustment values includes displaying, in the translucent portion of the control, a representation of the respective portion of content, wherein the representation of the respective portion of content is transformed in accordance with the respective set of control-appearance values 938 After detecting the change in content from the first content to the second content and before changing the appearance of the control in accordance with the second set of control-appearance values, change the appearance of the control in accordance with the second content and the first set of control-appearance values

Figure 9E

DEVICE, METHOD, AND GRAPHICAL USER INTERFACE FOR ADJUSTING THE APPEARANCE OF A CONTROL

RELATED APPLICATIONS

This application claims priority to U.S. Provisional Application Ser. No. 61/832,952, filed Jun. 9, 2013, and U.S. Provisional Application Ser. No. 61/801,988, filed Mar. 15, 2013, entitled "Device, Method, and Graphical User Interface for Adjusting the Appearance of a Control," which are incorporated herein by reference in their entirety.

TECHNICAL FIELD

This relates generally to electronic devices with displays, including but not limited to electronic devices that display soft keyboards and other virtual controls on their displays.

BACKGROUND

Electronic computing devices often display virtual controls on their displays. For example, keyboards, menus, dialog boxes, alerts, and other controls may appear and disappear while using applications on a portable electronic device (e.g., a smart phone, tablet, or notebook computer).

The initial display of a virtual control may be distracting to a user, causing the user to momentarily lose their place in an application. In addition, virtual controls that are displayed on top of other elements in an application user interface obscure or hide those elements, which also makes it harder for a user maintain context in an application. This is particularly true for portable devices with small displays, where the virtual control (e.g., a keyboard) may occupy a significant portion of the display.

SUMMARY

Accordingly, there is a need for electronic devices with less distracting virtual controls that help to maintain context in an application. This requires new methods and interfaces for adjusting the appearance of virtual controls. Such devices, methods and interfaces reduce the cognitive burden on a user and produce a more efficient human-machine interface.

The above deficiencies and other problems associated with user interfaces for electronic devices with displays are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on a touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display. The method includes: displaying a user interface on the display; determining a first set of content-display values for one or more content-display properties of first content that corresponds to a respective region of the display; determining a first set of control-appearance values for one or more control-appearance parameters based on the first set of content-display values; and displaying a control in the respective region of the display, wherein an appearance of the control is determined based on the first content and the first set of control-appearance values.

In accordance with some embodiments, an electronic device includes a display unit configured to display a user interface, and a processing unit coupled to the display unit. The processing unit is configured to: determine a first set of content-display values for one or more content-display properties of first content that corresponds to a respective region of the display unit; determine a first set of control-appearance values for one or more control-appearance parameters based on the first set of content-display values; and enable display of a control in the respective region of the display unit, wherein an appearance of the control is determined based on the first content and the first set of control-appearance values.

In accordance with some embodiments, an electronic device includes a display, optionally a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device with a display, optionally a touch-sensitive surface, optionally one or more sensors to detect intensity of contacts with the touch-sensitive surface, a memory, and one or more processors to execute one or more programs stored in the memory includes one or more of the elements displayed in the method described above, which are updated in response to inputs, as described in the method described above. In accordance with some embodiments, a computer readable storage medium has stored therein instructions which when executed by an electronic device with a display, optionally a touch-sensitive surface, and optionally one or more sensors to detect intensity of contacts with the touch-sensitive surface, cause the device to perform the operations of the method described above. In accordance with some embodiments, an electronic device includes: a display, optionally a touch-sensitive surface, and optionally one or more sensors to detect intensity of contacts with the touch-sensitive surface; and means for performing the operations of the method described above. In accordance with some embodiments, an information processing apparatus, for use in an electronic device with a display, optionally a touch-sensitive surface, and optionally one or more sensors to detect intensity of contacts with the touch-sensitive surface, includes means for performing the operations of the method described above.

Thus, electronic devices with displays are provided with virtual controls that are less distracting, while still being easy for a user to see and interact with, thereby increasing the effectiveness, efficiency, and user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9E are flow diagrams illustrating a method of adjusting the appearance of a control in accordance with some embodiments.

DESCRIPTION OF EMBODIMENTS

Figure 1A:
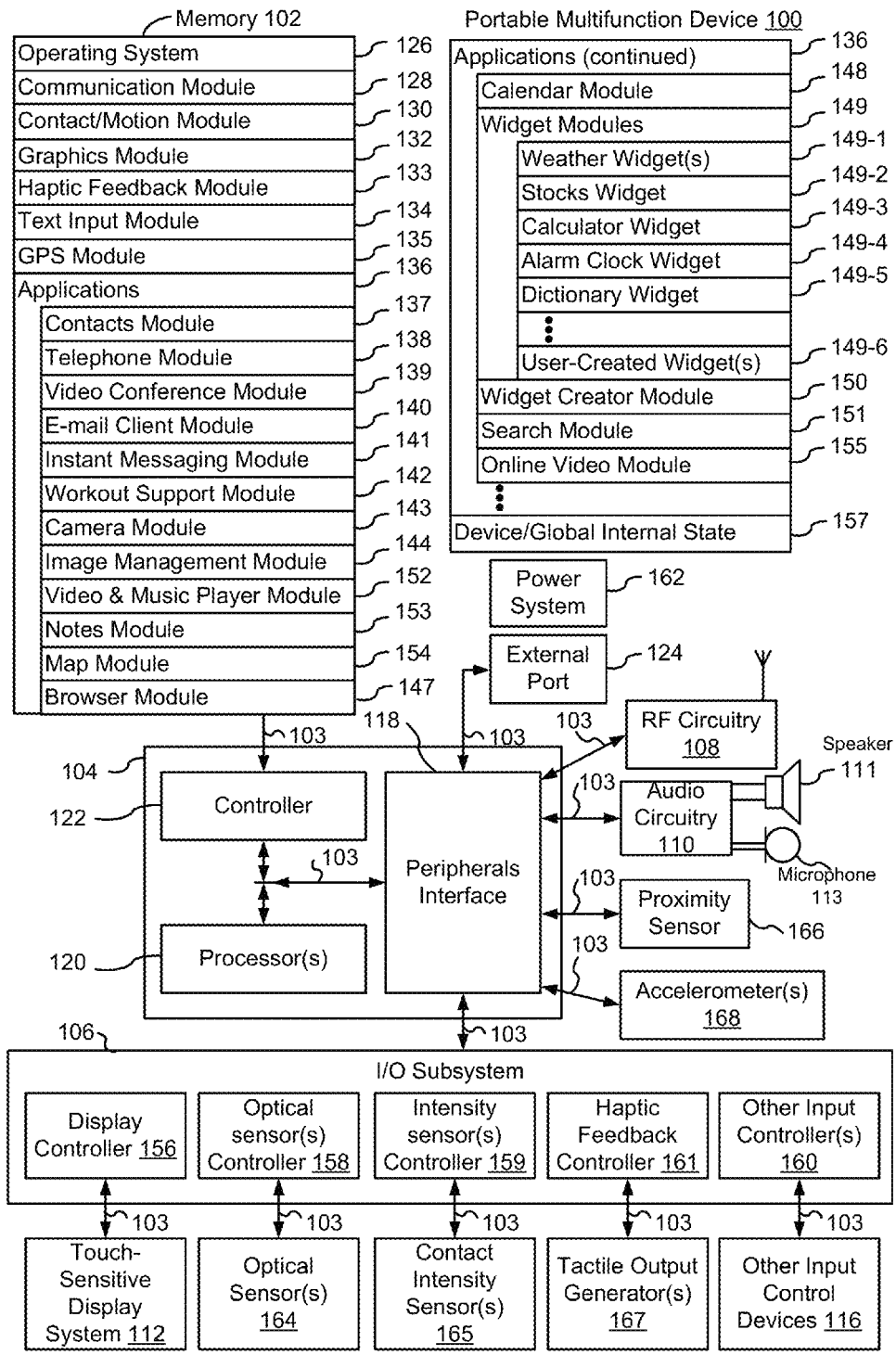
FIG. 1A is a block diagram illustrating a portable multifunction device with a touch-sensitive display in accordance with some embodiments.

Electronic devices often display virtual controls that appear and disappear while using applications on the device.

As noted above, the initial display of a virtual control may be distracting to a user, causing the user to momentarily lose their place in an application. In addition, virtual controls that are displayed on top of other elements in an application user interface obscure or hide those elements, which also makes it harder for a user maintain context in the application. This is particularly true for portable devices with small displays, where the virtual control (e.g., a keyboard) may occupy a significant portion of the display.

Here, electronic devices are disclosed with translucent (semitransparent) virtual controls whose appearance is automatically adjusted so that the controls are less distracting, while still being easy for a user to see and interact with.

A given translucent control is displayed over content in a particular region of the display. The device determines values for various content-display properties in the particular region (e.g., values for the hue, saturation, brightness, and/or contrast of the content underneath the control). In turn, the device determines a set of values for various control-appearance parameters (e.g., values for blur radius, saturation adjustment, opacity of a white overlay, opacity of a black overlay, opacity of user interface elements in the control, and/or color of text in the control) based on the determined values for the content-display properties. The appearance of the translucent control is then based on the content underneath the control and the determined values of the control-appearance parameters. The values for the content-display properties, the values for the control-appearance parameters, and thus the appearance of the control are automatically, dynamically updated as the content underneath the control changes.

These adjustments produce a translucent control whose appearance is less distracting than an opaque control or a translucent control that simply blurs the underlying content in a fixed manner. At the same time, these adjustments produce a translucent control that is easy to see and interact with. Overall, these adjustments provide translucent controls that reduce the cognitive burden on a user and produce a more efficient human-machine interface.

Note that the adjustments described herein to translucent controls can also be applied to other types of translucent user interface elements (e.g., docks, trays, and status bars).

Below, FIGS. 1A-1B, 2, and 3 provide a description of exemplary devices. FIGS. 4A-4B and 5A-5G illustrate exemplary user interfaces for adjusting the appearance of a control. FIGS. 9A-9E are flow diagrams illustrating a method of adjusting the appearance of a control. The user interfaces in FIGS. 5A-5G are used to illustrate the processes in FIGS. 9A-9E.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
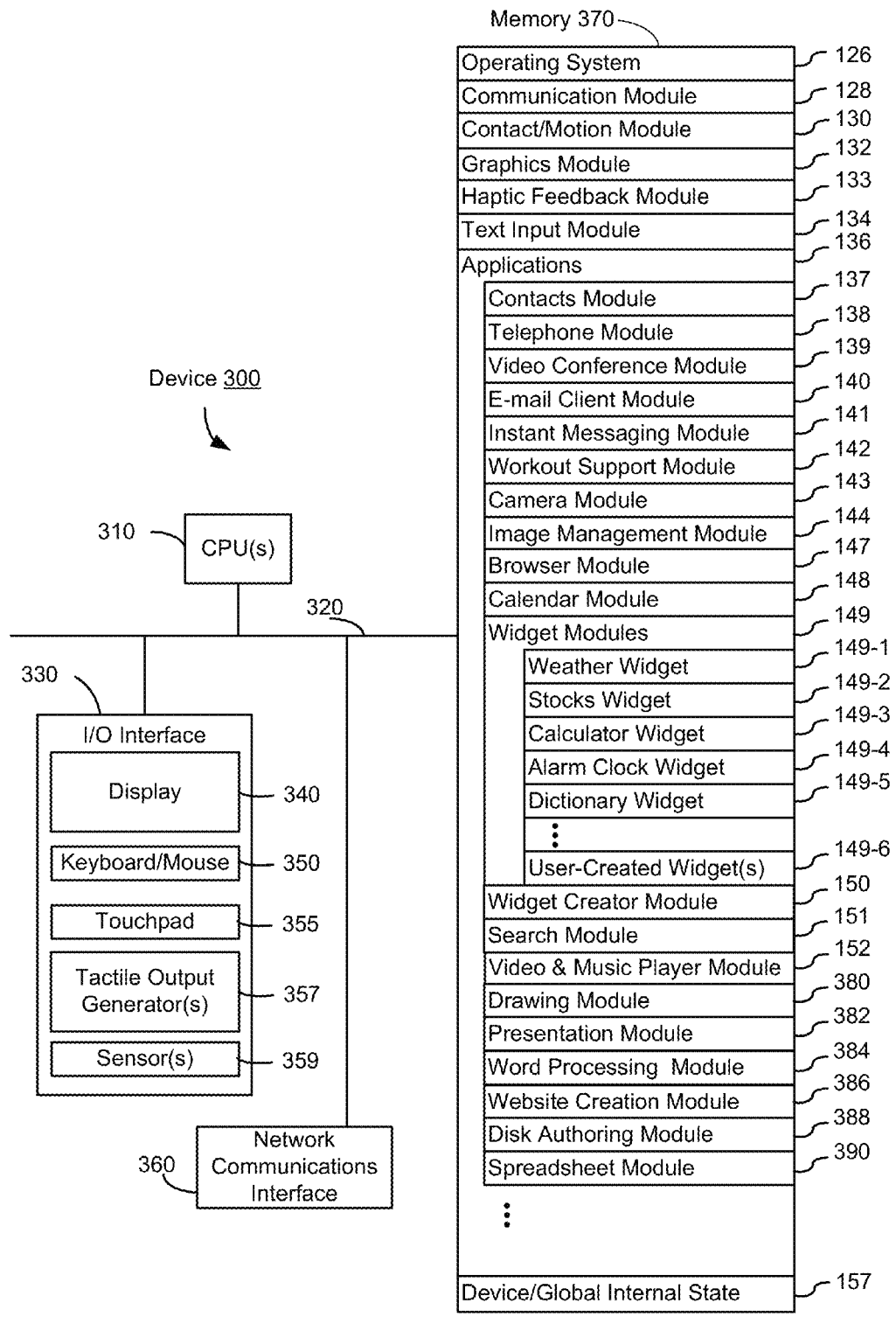
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3.

Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
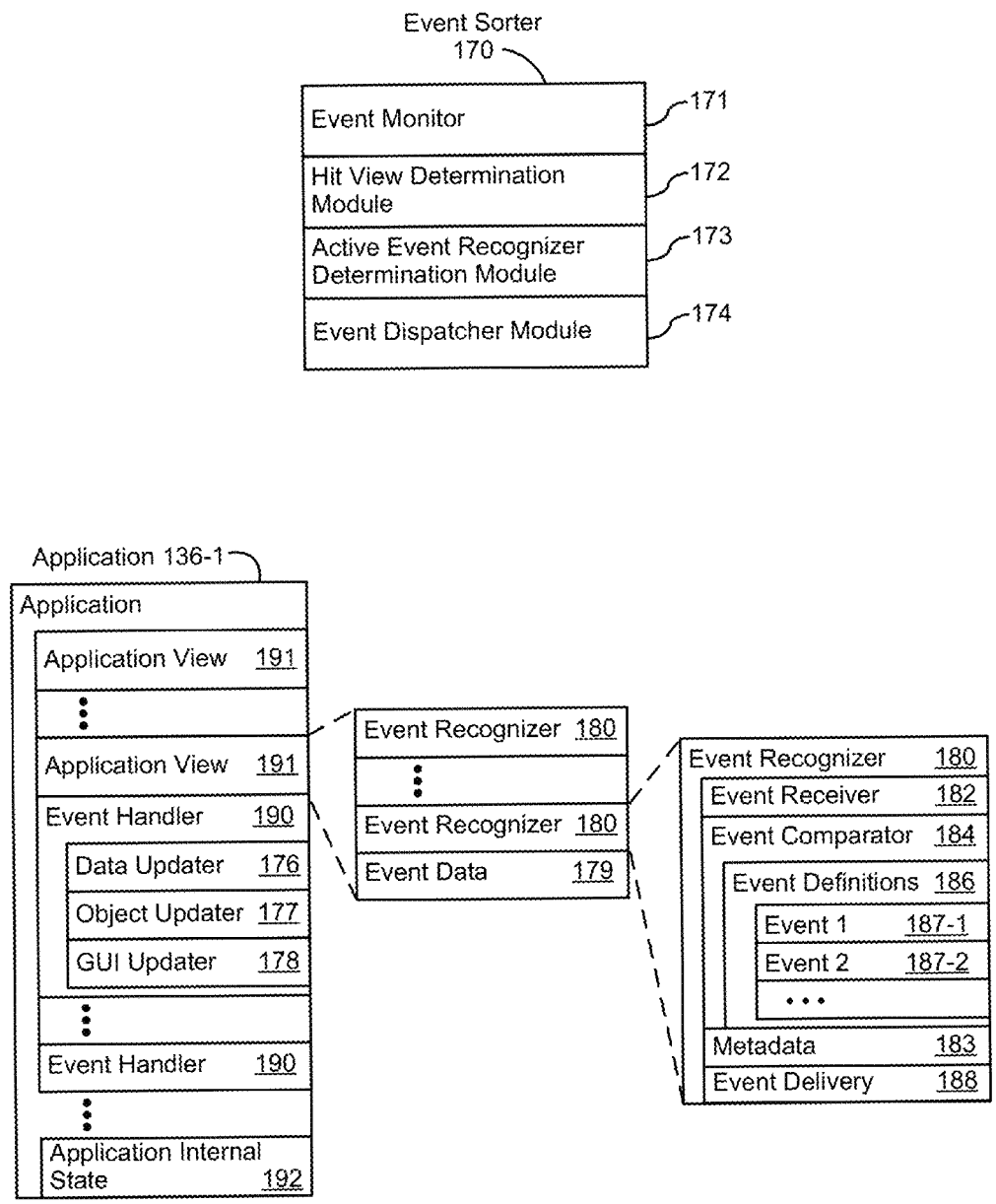
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
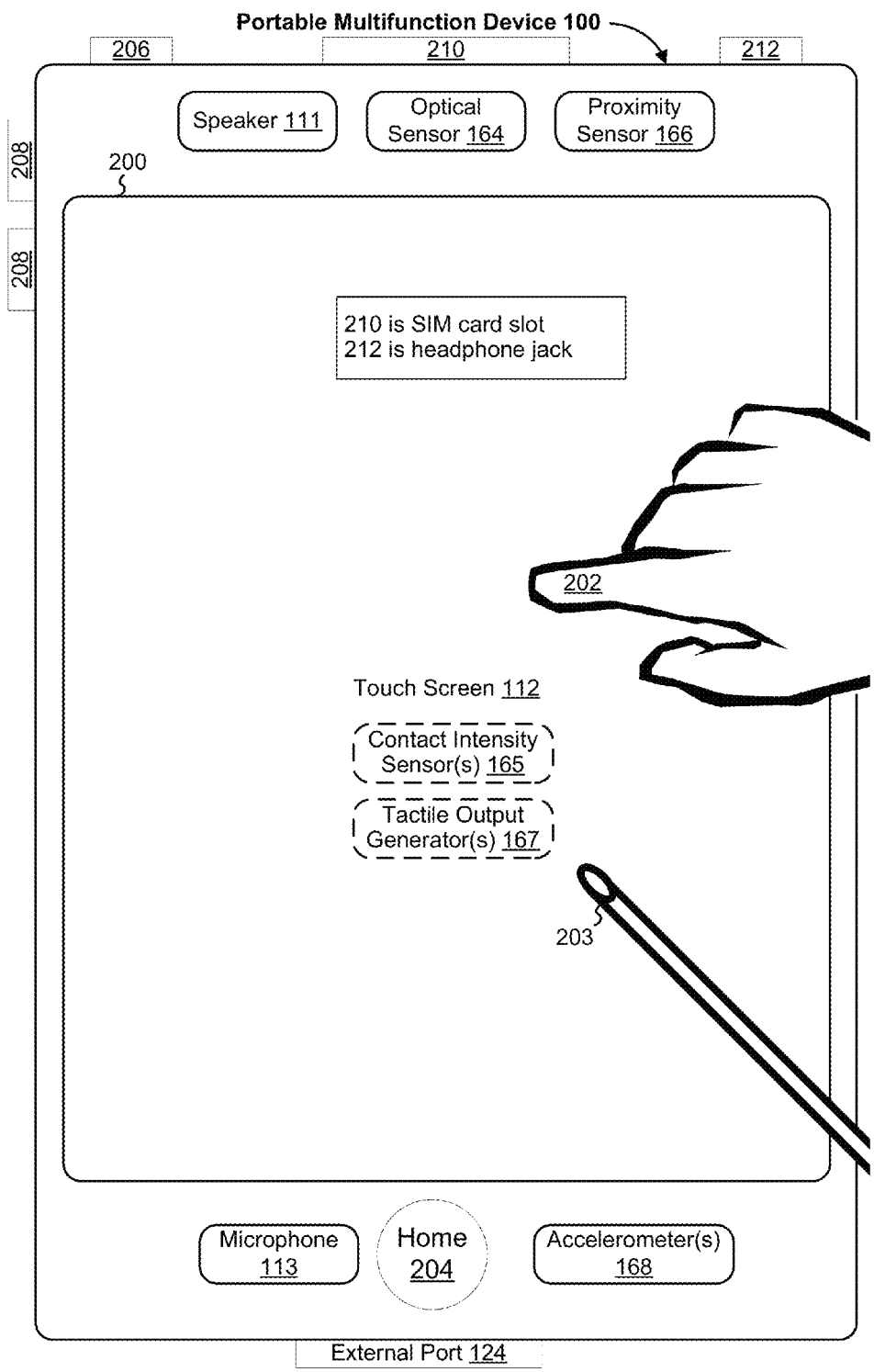
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
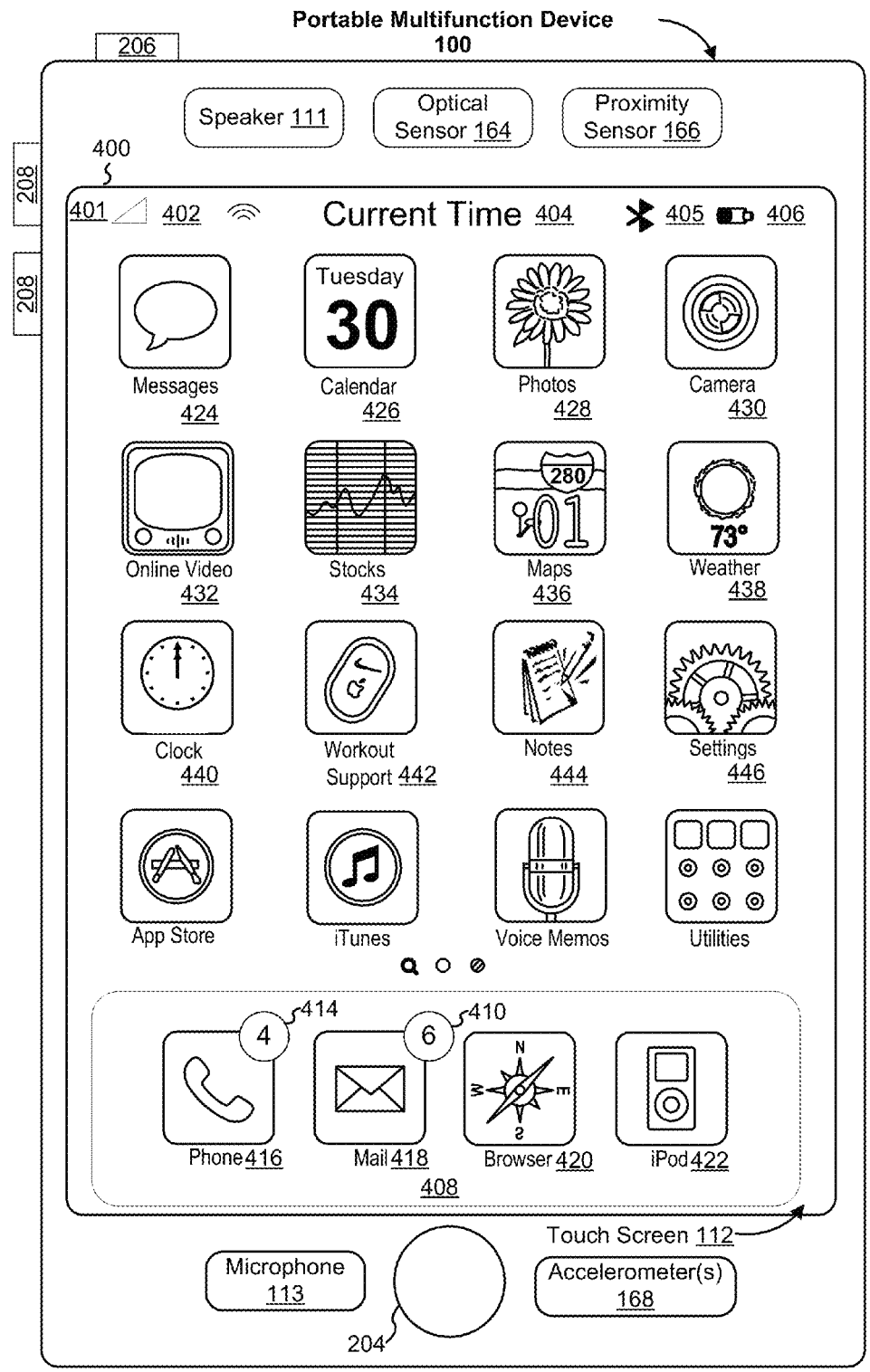
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Status bar 401 with status icons, such as:
Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video"
Icon 434 for stocks widget 149-2, labeled "Stocks;"
Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
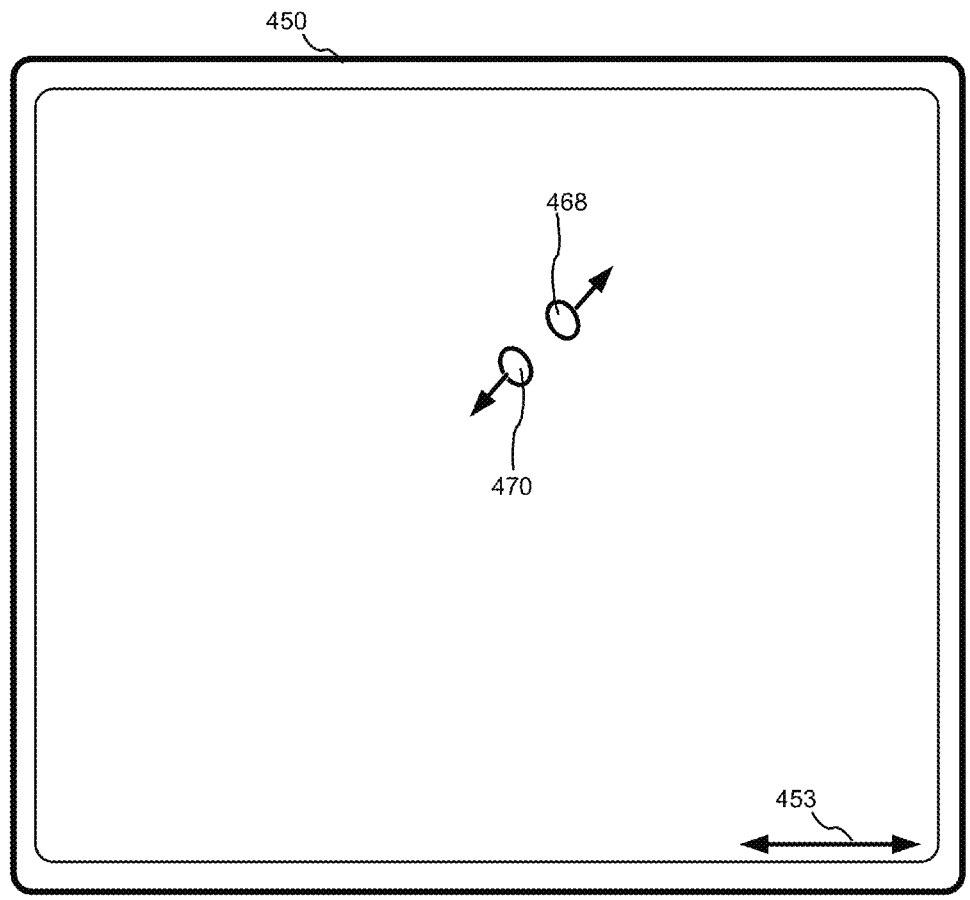
FIG. 4B illustrates an exemplary user interface for a multifunction device with a touch-sensitive surface that is separate from the display in accordance with some embodiments.
Figure 4B:
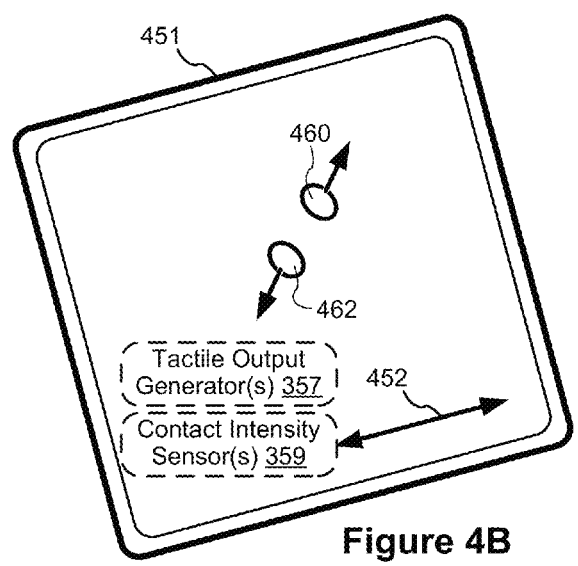

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5G illustrate exemplary prophetic user interfaces for adjusting the appearance of a control in accordance with some embodiments. The user interfaces in these figures are used to illustrate the processes described below, including the processes in FIGS. 9A-9E.

Figure 5A:
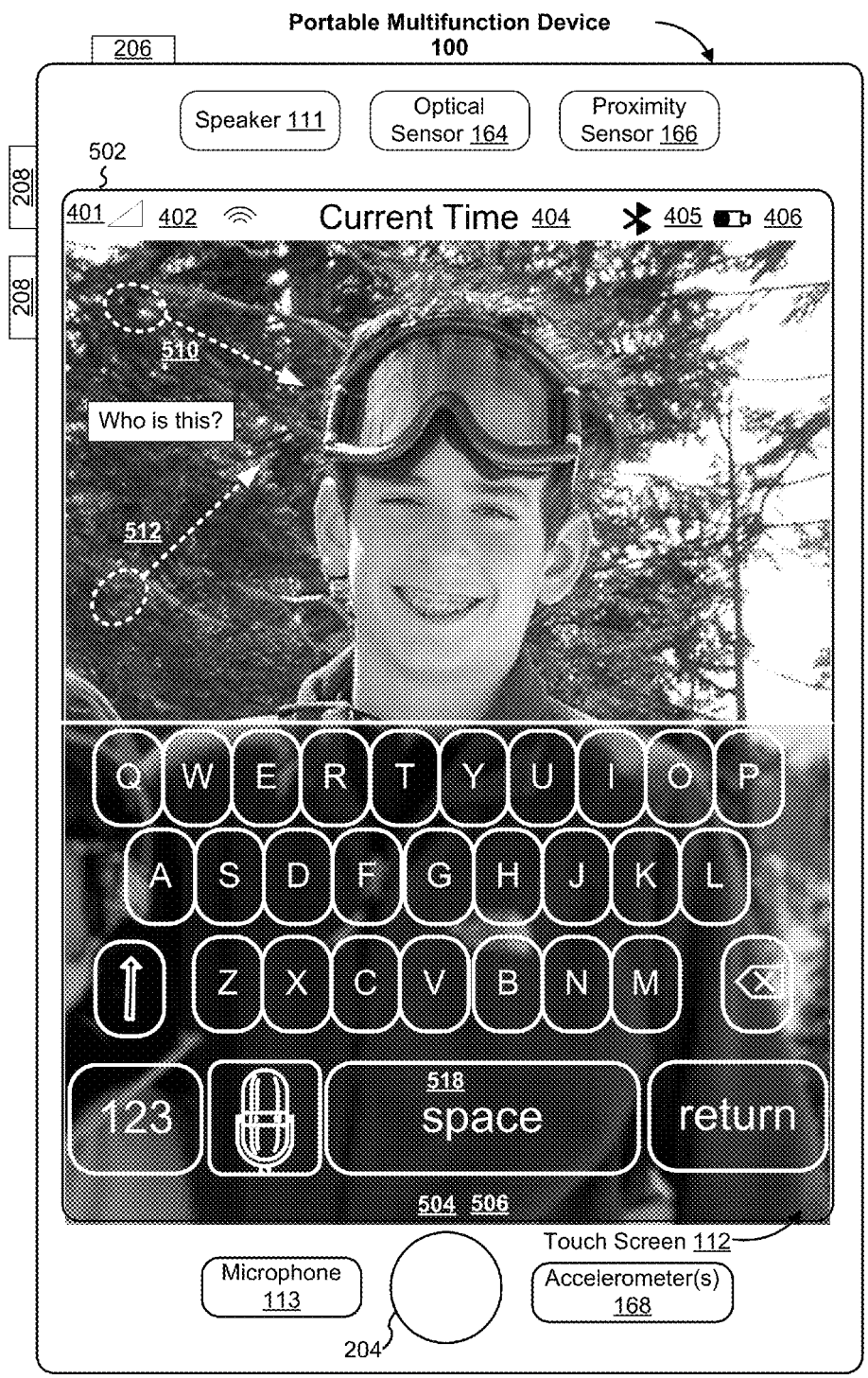
FIGS. 5A-5G illustrate exemplary prophetic user interfaces for adjusting the appearance of a control in accordance with some embodiments.

FIG. 5A illustrates an exemplary user interface 502 displayed on touch screen display 112. The user interface 502 includes content (e.g., a digital image and/or other graphics). A translucent keyboard 518 is displayed in predefined region 504 of the display.

Figure 5B:
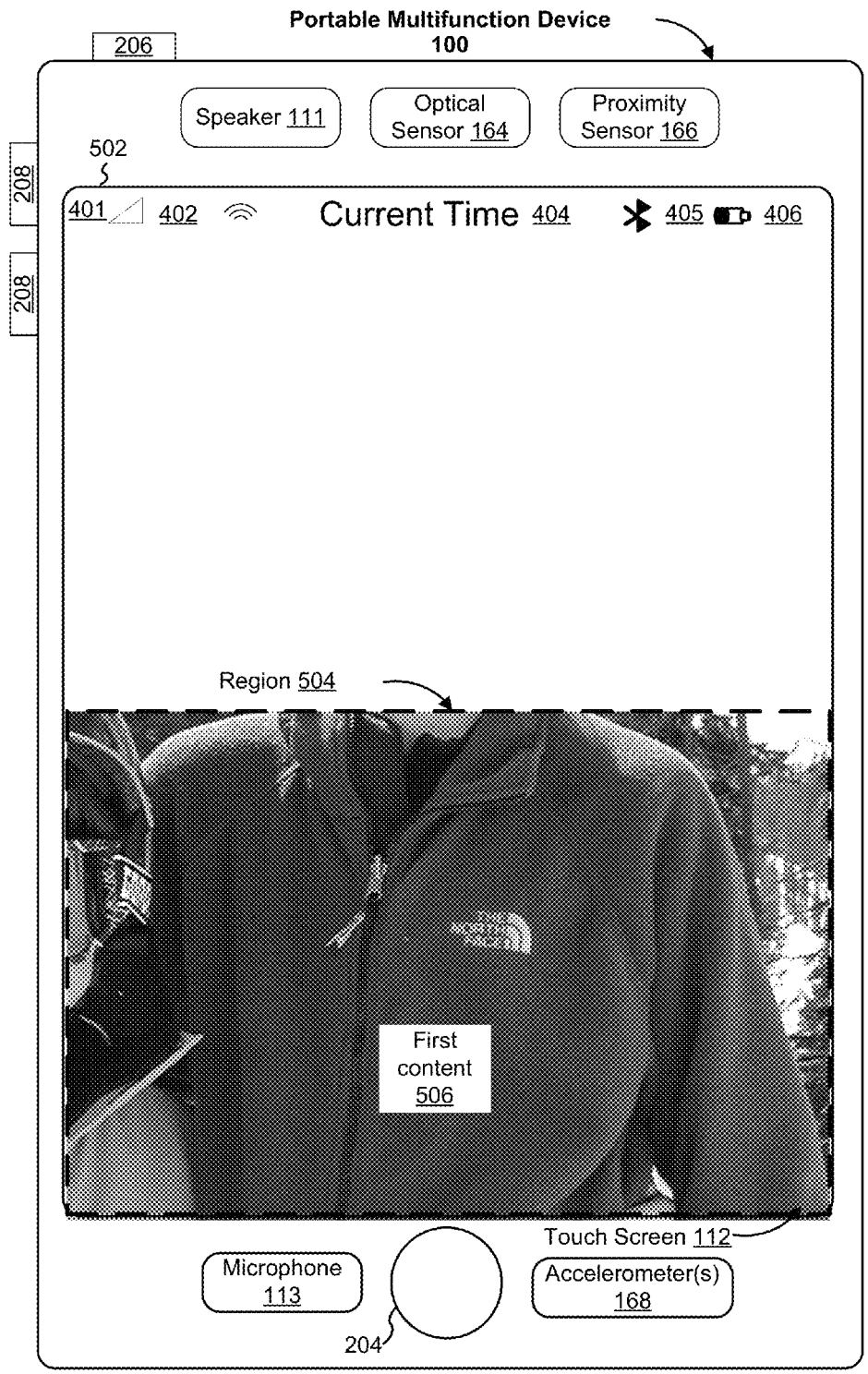

FIG. 5B illustrates first content 506 that corresponds to predefined region 504. The device determines content-display properties of the first content 506.

Figure 6:
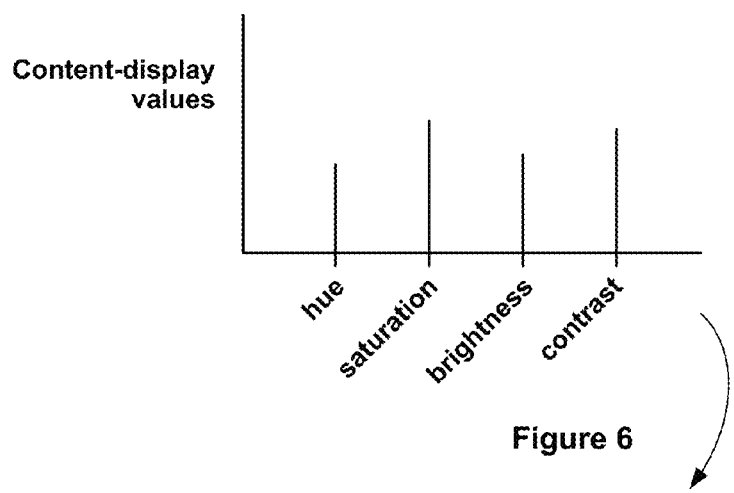
FIG. 6 illustrates schematically an exemplary prophetic set of values of content-display properties determined for content in a region where a control is displayed in accordance with some embodiments.

FIG. 6 illustrates schematically an exemplary prophetic set of values of content-display properties determined for content in a region where a control is displayed in accordance with some embodiments. For example, the device determines values for hue, saturation, brightness, and contrast for first content 506 that corresponds to region 504.

The device determines values for control-appearance parameters for keyboard 518 based on the determined values of content-display properties for first content 506.

Figure 7:
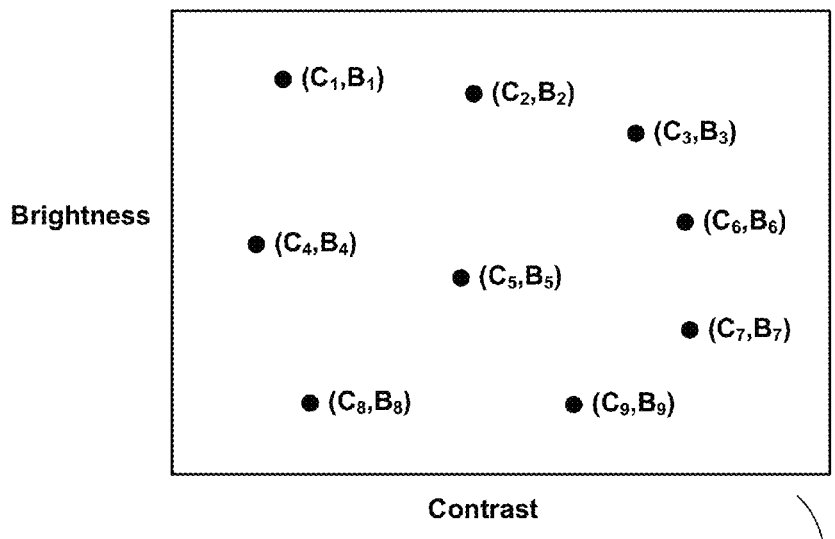
FIG. 7 is a schematic illustration of predefined prophetic sets of content-display values that have been assigned to corresponding predefined sets of control-appearance values that may be used to determine control-appearance values via interpolation in accordance with some embodiments.

FIG. 7 is a schematic illustration of predefined prophetic sets of content-display values that have been assigned to corresponding predefined sets of control-appearance values that may be used to determine control-appearance values via interpolation in accordance with some embodiments.

Figure 8:
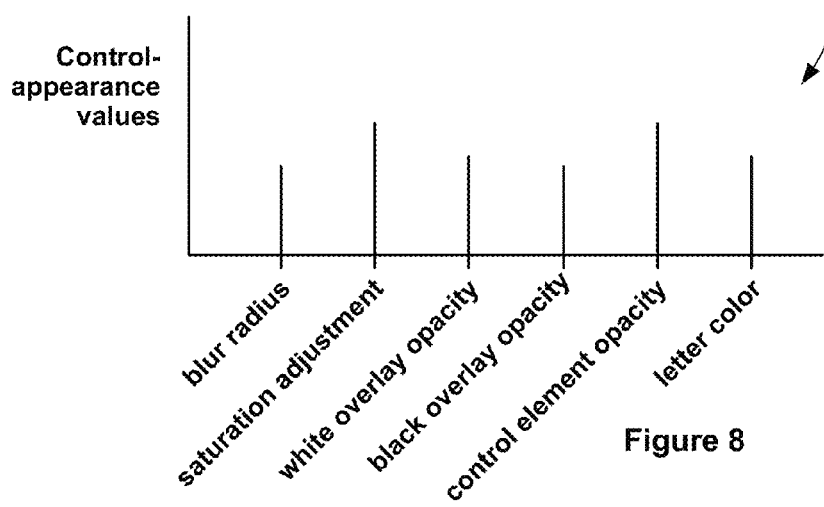
FIG. 8 illustrates schematically an exemplary prophetic set of values of control-appearance parameters for a control in accordance with some embodiments.
Figure 9A:
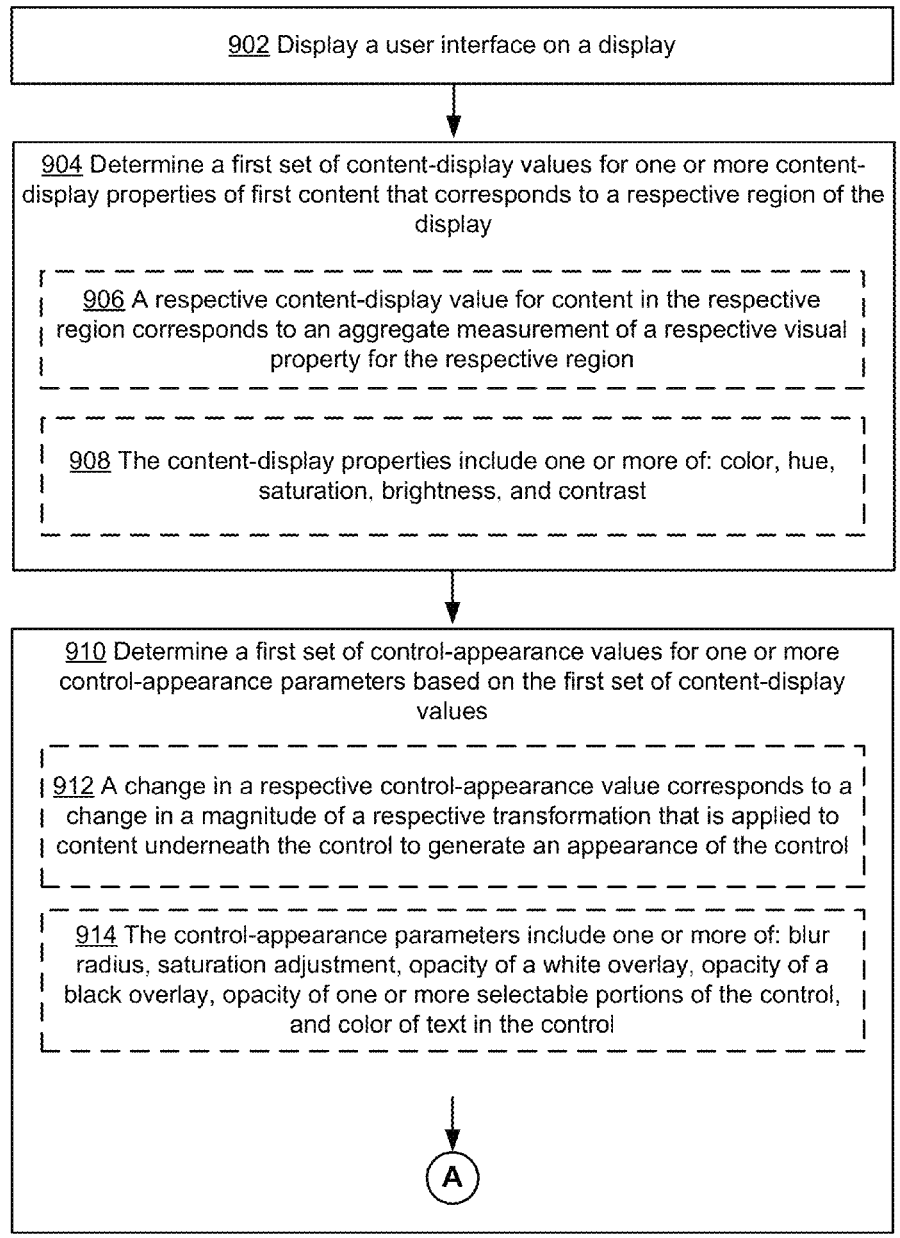
Figure 9B:
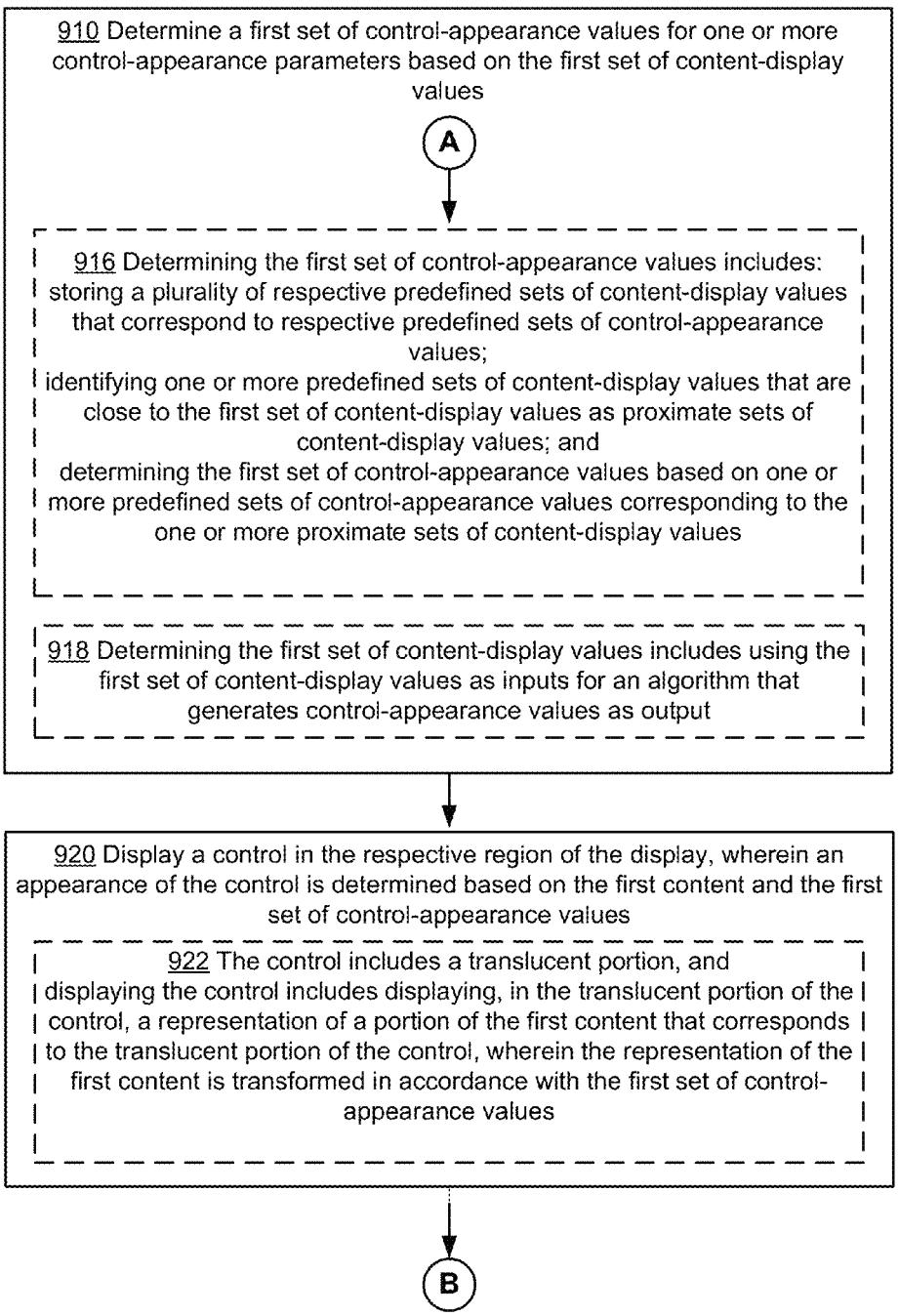

FIG. 8 illustrates schematically an exemplary prophetic set of values of control-appearance parameters for a control in accordance with some embodiments.

In some embodiments, the device uses prior mappings of content-display values (e.g., FIG. 7) to control-appearance values to determine values for blur radius, saturation adjustment, opacity of a white overlay, opacity of a black overlay, opacity of user interface elements in keyboard 518, and/or color of text in keyboard 518 (e.g., FIG. 8).

The appearance of keyboard 518 in FIG. 5A is based on first content 506 and the determined first set of control-appearance values for blur radius, saturation adjustment, opacity of a white overlay, opacity of a black overlay, opacity of user interface elements in keyboard 518, and/or color of text in keyboard 518. For example, in FIG. 5A, the first content 506 in region 504 has been blurred in accordance with the value for the blur radius (as seen by comparing FIG. 5A and FIG. 5B), the text color is white, etc.

FIG. 5A also shows two different gestures, 510 and 512, each of which causes translation of the digital image in FIG. 5A so that a new portion of the digital image is displayed in user interface 502. Swipe gesture 510 translates the digital image to that portion of the digital image shown in FIG. 5C. Swipe gesture 512 translates the digital image to that portion of the digital image shown in FIGS. 5D-5F.

Figure 5C:
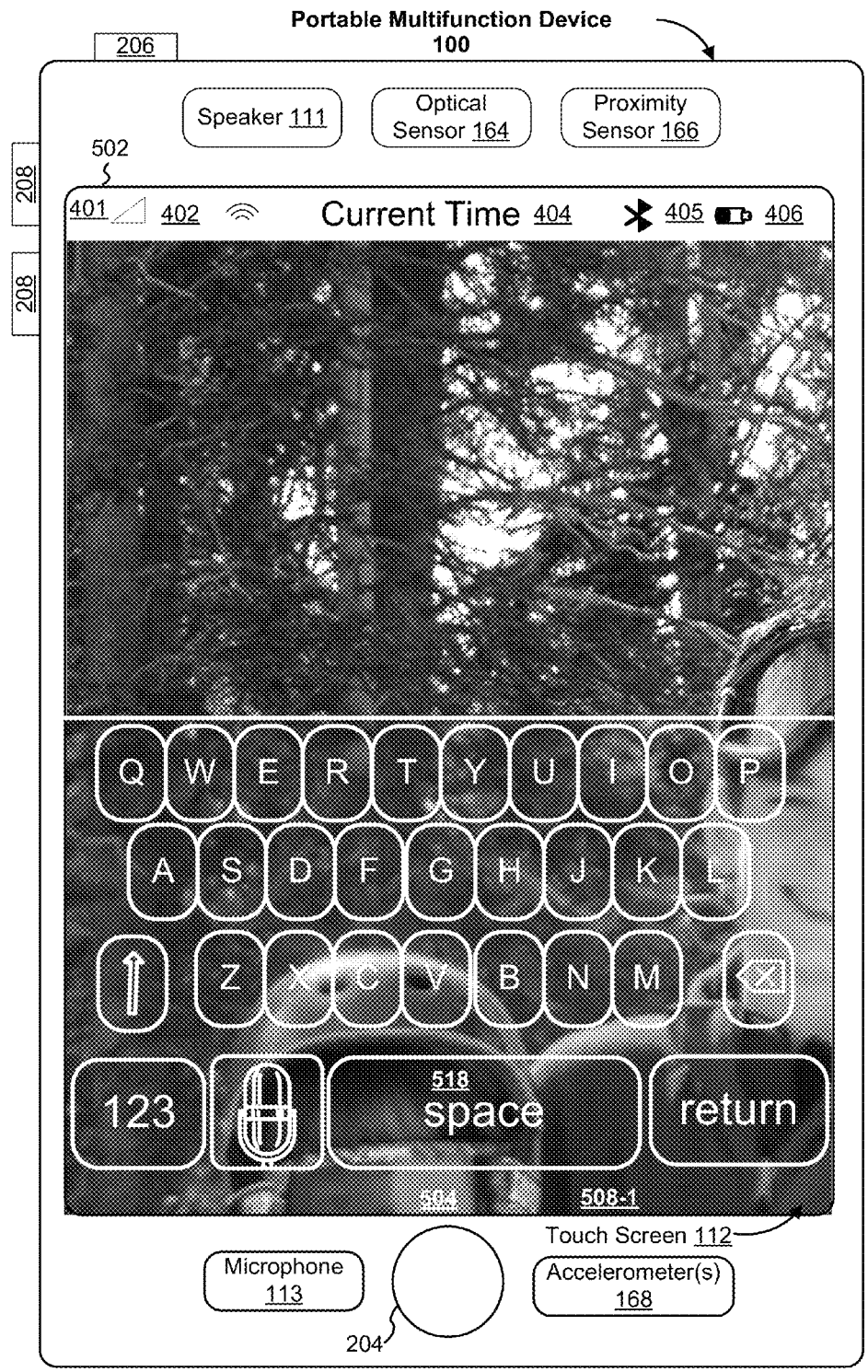

In FIG. 5C, the content that corresponds to region 504 (where keyboard 518 is located) has changed from first content 506 to second content 508-1. The device detects this change in content, and determines a second set of content-display values for the second content 508-1. In turn, the device determines a second set of control-appearance values, and changes the appearance of keyboard 518 in accordance with the second content 508-1 and the second set of control-appearance values. In this example, keyboard 518 still displays white text on the keys, but there is less blurring of second content 508-1 (as compared to first content 506) because the value of the blur radius is smaller.

Figure 5D:
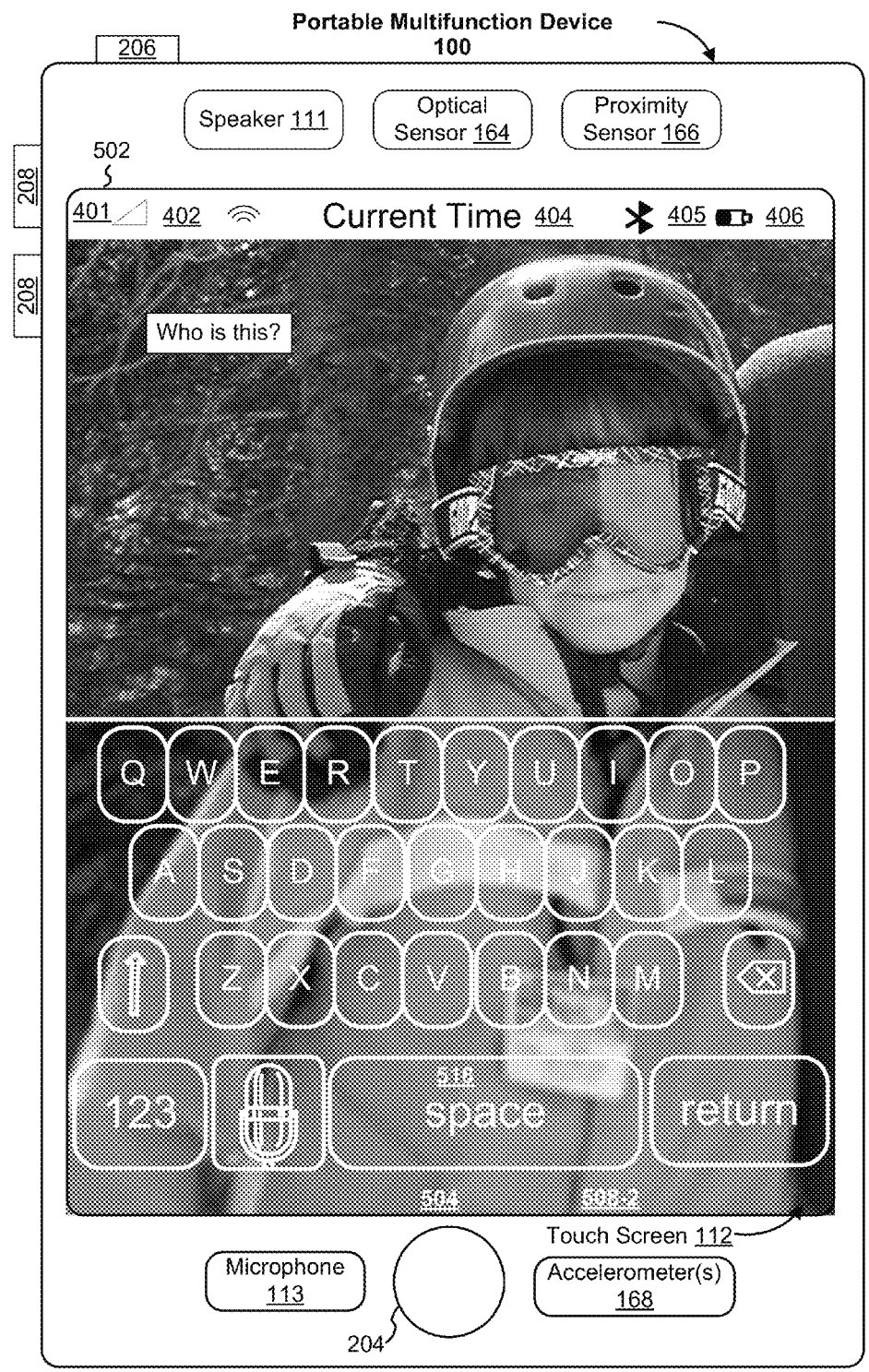

FIG. 5D illustrates that the content optionally moves faster than the control-appearance values change. In FIG. 5D, the content that corresponds to region 504 (where keyboard 518 is located) has just been changed from first content 506 to second content 508-2. The appearance of keyboard 518 has changed because of the change in content that corresponds to region 504, from first content 506 to second content 508-2. In this example, however, the device has not yet determined or applied a second set of control-appearance values, so the first set of control-appearance values is applied instead.

Figure 5E:
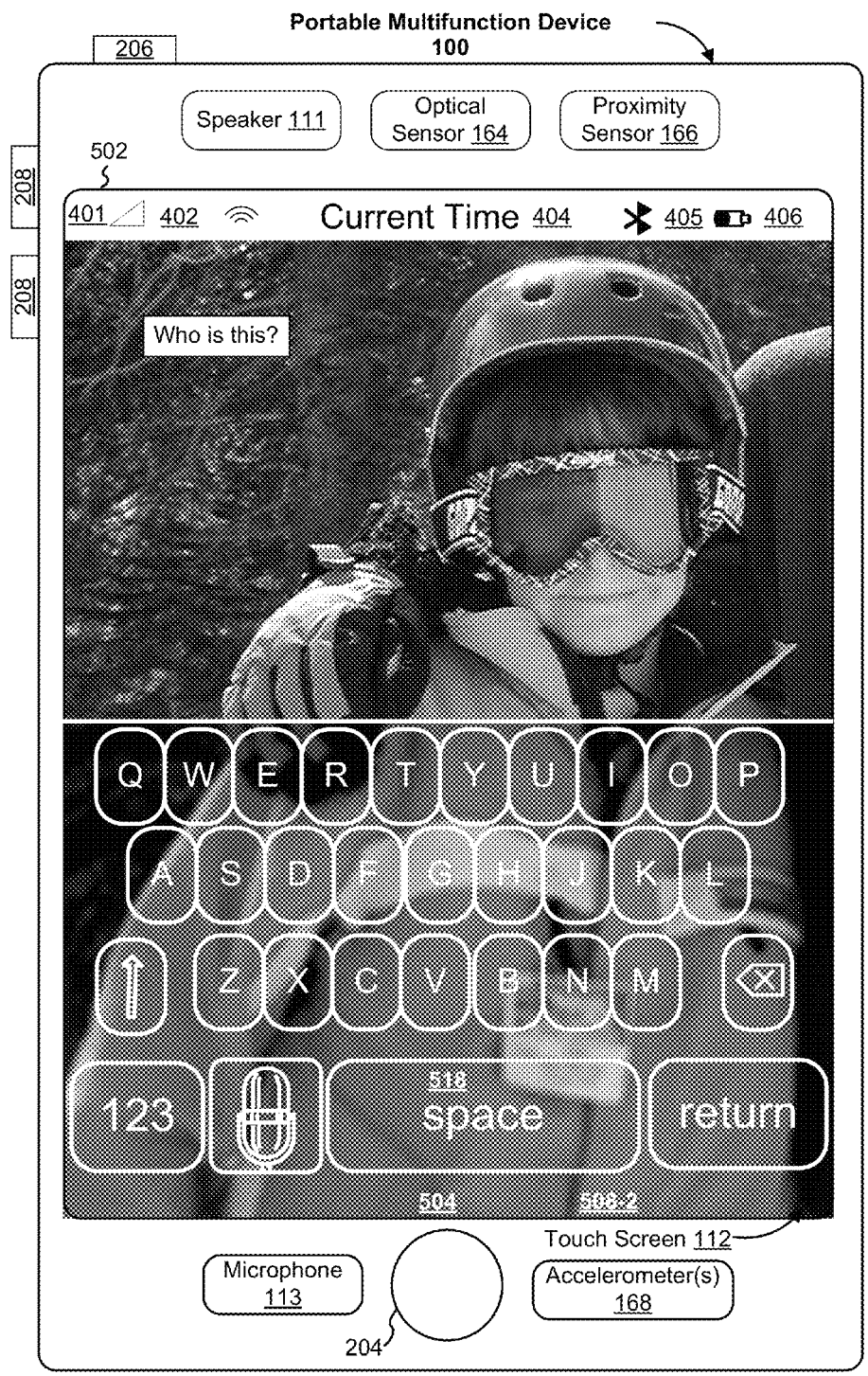
Figure 5F:
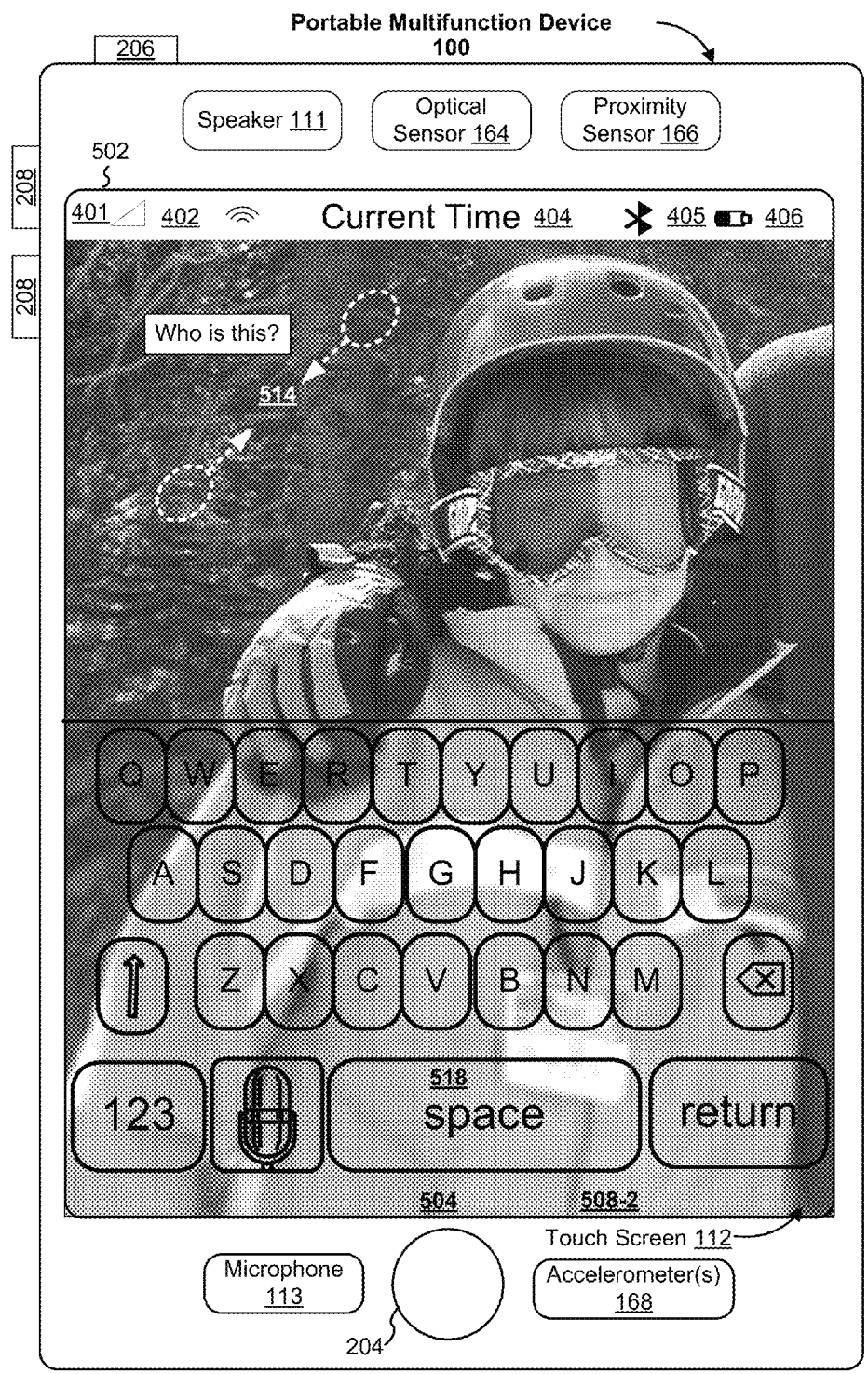

FIGS. 5A, 5E, and 5F illustrate that the change from a keyboard 518 with white keys (FIG. 5A) to a keyboard 518 with black keys (FIG. 5F) optionally proceeds via an intermediate keyboard 518 with white keys and an updated set of control-appearance values based on content-display values for content 508-2 (FIG. 5E). In FIG. 5E, the content that corresponds to region 504 (where keyboard 518 is located) has changed from first content 506 to second content 508-2. The device detects this change in content, and determines a second set of content-display values for the second content 508-2. In turn, the device determines a respective, updated set of control-appearance values, and changes the appearance of keyboard 518 in accordance with the second content 508-1 and the updated set of control-appearance values. In this example, keyboard 518 still displays white text on the keys in FIG. 5E (prior to switching to displaying black text on the keys in FIG. 5F), but the appearance of the keyboard in FIG. 5E is different from the appearance of the keyboard 518 in FIG. 5D. The keyboard in FIG. 5E uses an updated set of control-appearance values based on content-display values for content 508-2 (FIG. 5E), whereas the keyboard in FIG. 5D uses the first set of control-appearance values. The use of the updated set of control-appearance values makes the keyboard 518 in FIG. 5E more legible than the keyboard in FIG. 5D.

In FIG. 5F, the content that corresponds to region 504 (where keyboard 518 is located) has changed from first content 506 to second content 508-2. The device detects this change in content, and determines a second set of content-display values for the second content 508-2. In turn, the device determines a second set of control-appearance values, and changes the appearance of keyboard 518 in accordance with the second content 508-2 and the second set of control-appearance values. In this example, keyboard 518 displays black text on the keys (e.g., due to the brighter content in 508-2), and other control-appearance values have changed as well from those for the keyboard in FIG. 5A.

In embodiments where an intermediate keyboard with white keys is displayed based on a respective, updated set of control-appearance values prior to displaying a keyboard with black keys (e.g., when the keyboard in FIG. 5E is displayed before the keyboard in FIG. 5F), the second set of control-appearance values (for the keyboard with black text in FIG. 5F) will typically contain different control-appearance values than the updated set of control-appearance values (for the keyboard with white text in FIG. 5E), beyond just changing the value of the letter color from white to black. In other words, for the same set of content-display values, the control-appearance values for a keyboard with black text will typically be different from the control-appearance values for a keyboard with white text because the amount of blur, saturation adjustment, opacity, etc. needed to make a keyboard with black text easy to see and use are typically different from the amount of blur, saturation adjustment, opacity, etc. needed to make a keyboard with white text easy to see and use. In some embodiments, the set of control-appearance parameters that are adjusted for a keyboard with black text are different from the set of control-appearance parameters that are adjusted for a keyboard with white text.

Figure 5G:
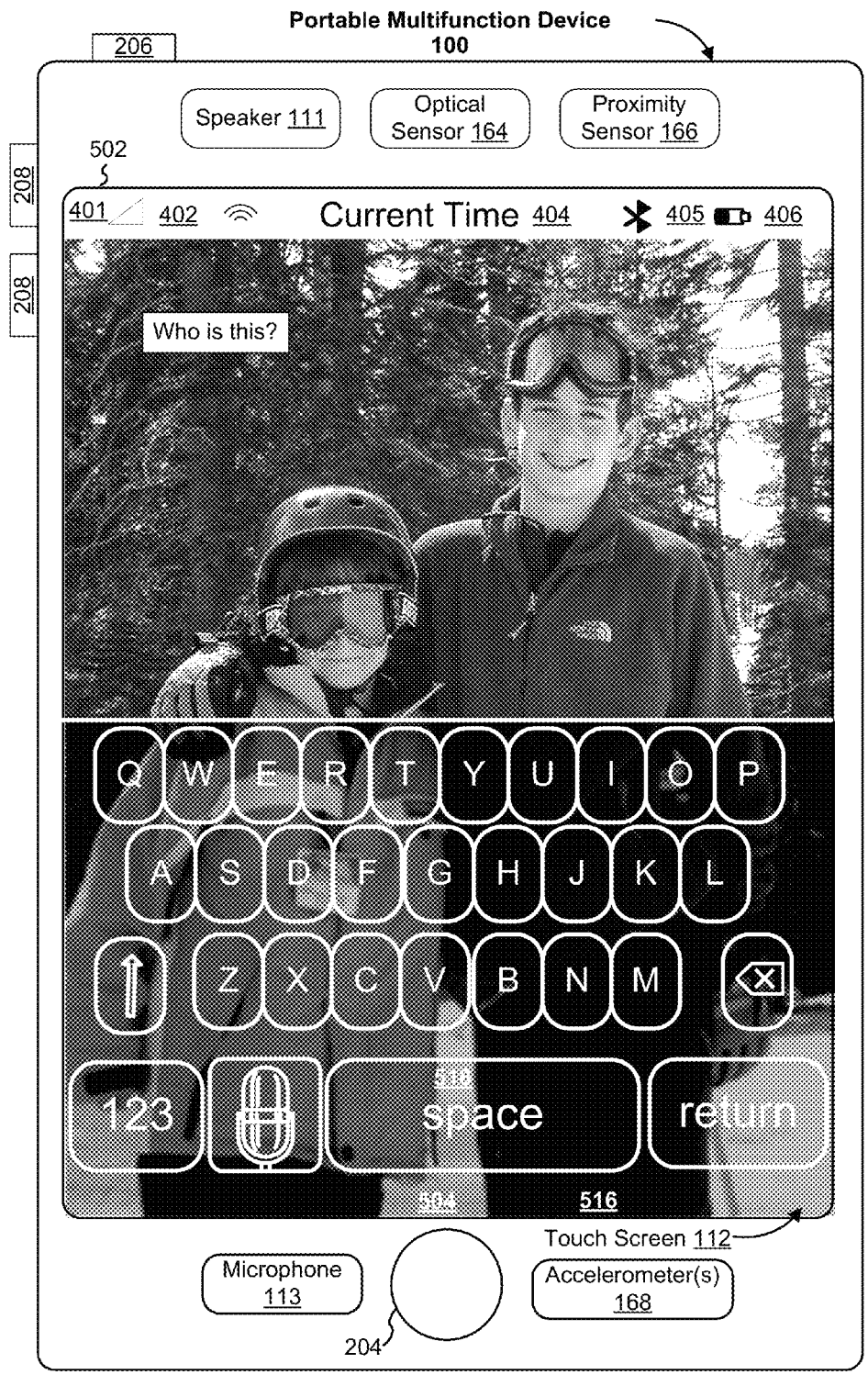

FIG. 5F also shows a pinch gesture 514 that causes the device to zoom out (demagnify) the digital image in FIG. 5F so that a new portion of the digital image is displayed in user interface 502, as shown in FIG. 5G.

In FIG. 5G, the content that corresponds to region 504 (where keyboard 518 is located) has changed from second content 508-2 to content 516. The device detects this change in content, and determines a new set of content-display values for content 516. In turn, the device determines a new set of control-appearance values, and changes the appearance of keyboard 518 in accordance with the content 516 and the new set of control-appearance values. In this example, keyboard 518 changes from displaying black text to displaying white text (e.g., due to the darker content in 516), and other control-appearance values change as well.

FIGS. 9A-9E are flow diagrams illustrating a method 900 of adjusting the appearance of a control in accordance with some embodiments. The method 900 is performed at an electronic device (e.g., device 300, FIG. 3, or portable multifunction device 100, FIG. 1A) with a display and optionally a touch-sensitive surface. In some embodiments, the display is a touch screen display and the touch-sensitive surface is on the display. In some embodiments, the display is separate from the touch-sensitive surface. Some operations in method 900 are, optionally, combined and/or the order of some operations is, optionally, changed.

As described below, the method 900 provides a translucent control whose appearance is less distracting than an opaque control or a translucent control that simply blurs the underlying content in a fixed manner. At the same time, the method 900 provides a translucent control that is easy to see and interact with. Overall, the method 900 provides translucent controls that reduce the cognitive burden on a user and produce a more efficient human-machine interface.

The device displays (902) a user interface on the display (e.g., user interface 502, FIG. 5A).

The device determines (904) (e.g., by retrieving or calculating) a first set of content-display values for one or more content-display properties (e.g., hue, saturation, brightness, contrast) of first content that corresponds to a respective region of the display. In some embodiments, the first content is a portion of a webpage or image over which a keyboard or other control is displayed (e.g., in a predetermined or predefined region of the display). For example, the device determines a first set of content-display values for hue, saturation, brightness, and contrast (e.g., FIG. 6) for first content 506 that corresponds to a region 504 of the display 112, as shown in FIG. 5B.

In some embodiments, a respective content-display value for content in the respective region corresponds (906) to a statistical measurement (e.g., an average or standard deviation) of a respective visual property for the respective region. For example, the device may determine average values of hue, saturation, brightness, and/or contrast for first content 506 in region 504. In some embodiments, to reduce overhead and increase computational efficiency, the statistical measurement includes sampling just a subset of the pixels in the respective region and determining a statistical measurement of the sampled pixels. For example, the device may sample the pixels in the content 506. In some embodiments, the device makes two passes over the content 506, a first pass sampling every 43rd pixel and a second pass sampling every 51st pixel.

In some embodiments, the content-display properties include (908) one or more of color, hue, saturation, brightness, and contrast. In some embodiments, contrast is based on a measurement of the standard deviation of brightness of a plurality of sampled pixels.

The device determines (910) (e.g., by selecting or calculating) a first set of control-appearance values for one or more control-appearance parameters based on the first set of content-display values, as illustrated schematically in FIGS. 6-8.

In some embodiments, a change in a respective control-appearance value corresponds (912) to a change in a magnitude of a respective transformation that is applied to content underneath the control to generate an appearance of the control. For example, a change in a blur radius value corresponds to a change in a magnitude of a blur transformation that is applied to content 506 (FIG. 5B) to generate an appearance of the keyboard 518 (FIG. 5A).

In some embodiments, the control-appearance parameters include (914) one or more of: blur radius (e.g., a radius of a blur operation applied to the content in the respective region), saturation adjustment (e.g., changing saturation of the content in the respective region), opacity of a white overlay (e.g., opacity of a white layer between the content in the respective region and selectable portions of the control such as keycaps of keys), opacity of a black overlay (e.g., opacity of a black layer between the content in the respective region and selectable portions of the control such as keycaps of keys), opacity of one or more selectable portions of the control (e.g., opacity of keycaps of a virtual keyboard or buttons in a notification), and color of text in the control (e.g., color of letters on a keyboard or words in a drop down menu, such as black or white).

In some embodiments, determining the first set of control-appearance values includes (916): storing a plurality of respective predefined sets of content-display values that correspond to respective predefined sets of control-appearance values; identifying one or more predefined sets of content-display values that are close to the first set of content-display values as proximate sets of content-display values (e.g., identifying the N closest sets of predefined control-appearance values in M-dimensional space, where M is the number of content-display properties represented by each set of content-display values); and determining the first set of control-appearance values based on one or more predefined sets of control-appearance values corresponding to the one or more proximate sets of content-display values. In some embodiments, the first set of control-appearance values is one of the predefined sets of control-appearance values. In some embodiments, the first set of control-appearance values is an interpolation between two or more predefined sets of control-appearance values. In some embodiments, the predefined sets of control-appearance values are values determined/selected by a human designer/artist based on sample content with the corresponding set of predefined content-display values, so as to maximize translucency while maintaining legibility of the control displayed over the respective content.

In some embodiments, determining the first set of content-display values includes (918) using the first set of content-display values as inputs for an algorithm that generates control-appearance values as output.

The device displays (920) a control in the respective region of the display (e.g., displaying a translucent or semitransparent keyboard, toolbar, alert message, or menu such as a settings menu or a file menu in front of the first content because the control is above the first content in a z-order (front-to-back order) of objects in the user interface), wherein an appearance of the control is determined based on the first content and the first set of control-appearance values. For example, in FIG. 5A, the device displays keyboard 518 in region 504 of the display 112. The appearance of the keyboard 518 in FIG. 5A is determined based on the first content 506 and the first set of control-appearance values (e.g., FIG. 8).

In some embodiments, the control includes (922) a translucent portion, and displaying the control includes displaying, in the translucent portion of the control, a representation of a portion of the first content that corresponds to the translucent portion of the control, wherein the representation of the first content is transformed in accordance with the first set of control-appearance values (e.g., from an unobscured rendering of the first content to a rendering of the first content that is obscured by the translucent portion of the control). For example, in FIG. 5A, keyboard 518 includes a translucent portion, and displaying keyboard 518 includes displaying, in the translucent portion of keyboard 518, a representation of a portion of the first content 506 that corresponds to the translucent portion of keyboard 518. The representation of the first content 506 is transformed in accordance with the first set of control-appearance values from an unobscured rendering of the first content (FIG. 5B) to a rendering of the first content 506 that is obscured by the translucent portion of the control (FIG. 5A).

In some embodiments, while displaying the control in the respective region of the display (924): the device detects a change in content that corresponds to the respective region of the display from the first content to second content, different from the first content (e.g., scrolling a webpage or photo in response to a gesture or loading new content such that the content in the respective region of the display behind the control changes); determines a second set of content-display values, different from the first set of content-display values, for the one or more content-display properties of the second content (e.g., hue, saturation, brightness, and/or contrast); determines a second set of control-appearance values for one or more control-appearance parameters based on the second set of content-display values, wherein the second set of control-appearance values is different from the first set of control-appearance values; and, in response to detecting the change in content, changes the appearance of the control in accordance with the second content and the second set of control-appearance values. In some embodiments, the device checks for a change in content behind the translucent control at predefined intervals (e.g., four times per second). In some embodiments, the device checks for a change in content in response to detecting a gesture corresponding to adjustment of content (e.g., a swipe gesture associated with translation or scrolling of content, a pinch or de-pinch gesture associated with resizing content, or a tap gesture associated with loading content). In some embodiments, the device checks for a change in content in response to receiving a report from an application that new content is being loaded (e.g., in response to receiving a report from a web browser that a new image has been loaded in a frame that is under the keyboard).

In some embodiments, changing the appearance of the control includes changing (926) a color of text in the control (e.g., changing from black letters in FIG. 5F to white letters in FIG. 5G).

In some embodiments, the control includes (928) a translucent portion, and changing the appearance of the control in accordance with the second set of control-appearance values includes displaying, in the translucent portion of the control, a representation of a portion of the second content that corresponds to the translucent portion of the control, wherein the representation of the second content is transformed in accordance with the second set of control-appearance values (e.g., from an unobscured rendering of the second content to a rendering of the second content that is obscured by the translucent portion of the control). For example, in FIG. 5F, keyboard 518 includes a translucent portion, and displaying keyboard 518 includes displaying, in the translucent portion of keyboard 518, a representation of a portion of the second content 508-2 that corresponds to the translucent portion of keyboard 518. The representation of the second content 508-2 is transformed in accordance with the second set of control-appearance values from an unobscured rendering of the second content 508-2 (not shown, but analogous to the unobscured rendering in FIG. 5B for first content 506) to a rendering of the second content 508-2 that is obscured by the translucent portion of the control (FIG. 5F).

In some embodiments, the first set of control-appearance values are (930) values for a first set of control-appearance parameters (e.g., white keyboard control-appearance parameters), and the second set of control-appearance values are values for the first set of control-appearance parameters (e.g., the white keyboard control-appearance parameters). For example, the first set of control-appearance values for the keyboard in FIG. 5A are for a first set of control-appearance parameters (e.g., FIG. 8), and the second set of control-appearance values for the keyboard in FIG. 5C are for the same first set of control-appearance parameters (e.g., FIG. 8).

In some embodiments, the first set of control-appearance values are (932) values for a first set of control-appearance parameters (e.g., white keyboard control-appearance parameters), and the second set of control-appearance values are values for a second set of control-appearance parameters different from the first set of control-appearance parameters (e.g., black keyboard control-appearance parameters). In other words, translucent white keyboards optionally have a different set of control-appearance parameters than translucent black keyboards.

In some embodiments, after detecting the change in content that corresponds to the respective region of the display from the first content to the second content and prior to changing the appearance of the control in accordance with the second set of control display values (934) (e.g., prior to displaying the dark keyboard for the second content 508-2 in FIG. 5F): the device determines a respective set of control-appearance values, different from the first set of control-appearance values, for the first set of control-appearance parameters based on the second set of content-display values, wherein the respective set of control appearance values is different from the first set of control-appearance values and the second set of control-appearance values; and changes the appearance of the control in accordance with the second content and the respective set of control-appearance values. For example, as explained above, FIGS. 5A, 5E, and 5F illustrate that the change from a keyboard 518 with white keys (FIG. 5A) to a keyboard 518 with black keys (FIG. 5F)

optionally proceeds via an intermediate keyboard 518 with white keys and an updated set of control-appearance values based on content-display values for content 508-2 (FIG. 5E). In some embodiments, the device displays a predefined animated transition between the keyboard 518 with white keys in FIG. 5E and the keyboard 518 with black keys in FIG. 5F.

In some embodiments, the control includes (936) a translucent portion; a respective portion of content (e.g., content in the respective region behind the control) corresponds to a location of the translucent portion of the control; and displaying the control in accordance with a respective set of control-adjustment values includes displaying, in the translucent portion of the control, a representation of the respective portion of content, wherein the representation of the respective portion of content is transformed in accordance with the respective set of control-appearance values (e.g., from an unobscured rendering of the respective portion of the content to a rendering of the respective portion of the content that is obscured by the translucent portion of the control). For example, in FIG. 5A, keyboard 518 includes a translucent portion, and displaying keyboard 518 includes displaying, in the translucent portion of keyboard 518, a representation of a portion of the first content 506 that corresponds to the translucent portion of keyboard 518. The representation of the first content 506 is transformed in accordance with the first set of control-appearance values from an unobscured rendering of the first content (FIG. 5B) to a rendering of the first content 506 that is obscured by the translucent portion of the control (FIG. 5A).

In some embodiments, after detecting the change in content from the first content to the second content and before changing the appearance of the control in accordance with the second set of control-appearance values (e.g., before determining the second set of control-appearance values or before applying the second set of control-appearance values), the device changes (938) the appearance of the control in accordance with: the second content and the first set of control-appearance values. For example, as described above with respect to FIG. 5D, the content optionally moves faster than the control-appearance values change. In some embodiments, content moving under the control is animated at a high frame rate (e.g., 60 fps) and the control-appearance values are updated at a low frame rate (e.g., 4 fps). Updating the content moving under the control at a high frame rate makes the device feel responsive, while updating the control-appearance values at a low frame rate reduces the computational requirements without a noticeable decrease in responsiveness.

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein.

Figure 10:
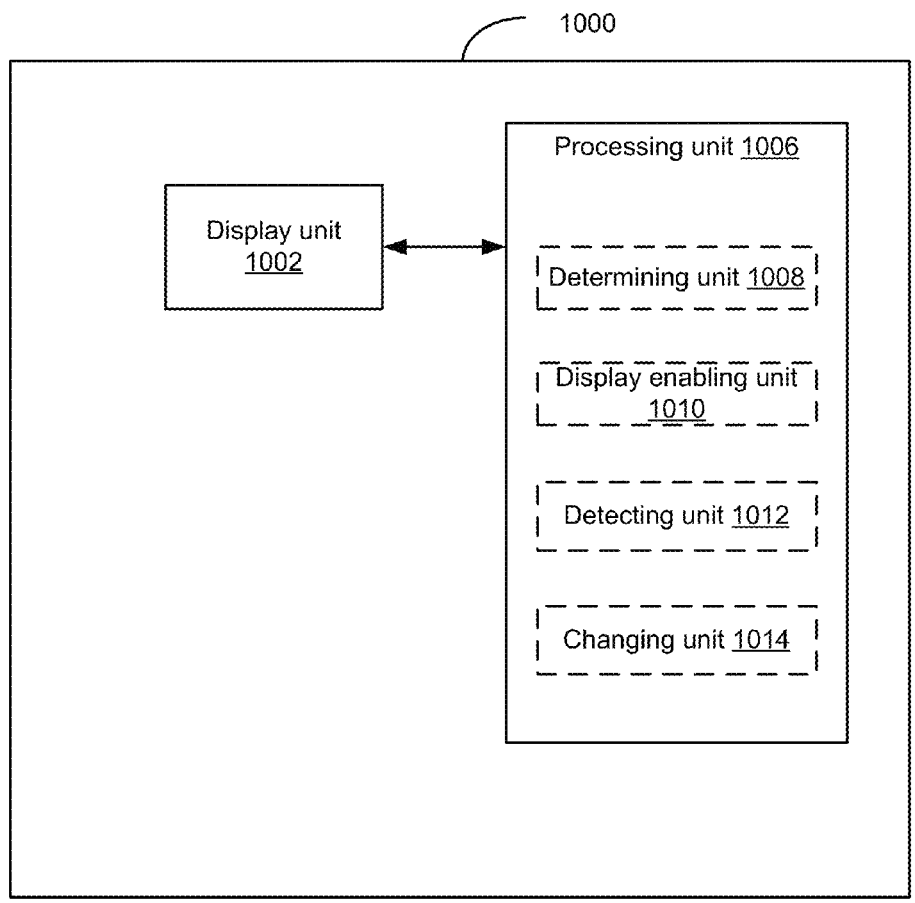
FIG. 10 is a functional block diagram of an electronic device in accordance with some embodiments.

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002 configured to display a user interface, and a processing unit 1006 coupled to the display unit 1002. In some embodiments, the processing unit 1006 includes a determining unit 1008, a display enabling unit 1010, a detecting unit 1012, and a changing unit 1014.

The processing unit 1006 is configured to: determine a first set of content-display values for one or more content-display properties of first content that corresponds to a respective region of the display unit 1002 (e.g., with the determining unit 1008); determine a first set of control-appearance values for one or more control-appearance parameters based on the first set of content-display values (e.g., with the determining unit 1008); and enable display of a control in the respective region of the display unit 1002 (e.g., with the display enabling unit 1010), wherein an appearance of the control is determined based on: the first content; and the first set of control-appearance values.

In some embodiments, a respective content-display value for content in the respective region corresponds to a statistical measurement of a respective visual property for the respective region.

In some embodiments, the content-display properties include one or more of: color, hue, saturation, brightness, and contrast.

In some embodiments, a change in a respective control-appearance value corresponds to a change in a magnitude of a respective transformation that is applied to content underneath the control to generate an appearance of the control.

In some embodiments, the control-appearance parameters include one or more of: blur radius, saturation adjustment, opacity of a white overlay, opacity of a black overlay, opacity of one or more selectable portions of the control, and color of text in the control.

In some embodiments, determining the first set of control-appearance values includes: storing a plurality of respective predefined sets of content-display values that correspond to respective predefined sets of control-appearance values; identifying one or more predefined sets of content-display values that are close to the first set of content-display values as proximate sets of content-display values; and determining the first set of control-appearance values based on one or more predefined sets of control-appearance values corresponding to the one or more proximate sets of content-display values.

In some embodiments, determining the first set of content-display values includes using the first set of content-display values as inputs for an algorithm that generates control-appearance values as output.

In some embodiments, the control includes a translucent portion; and enabling display of the control includes enabling, in the translucent portion of the control, display of a representation of a portion of the first content that corresponds to the translucent portion of the control, wherein the representation of the first content is transformed in accordance with the first set of control-appearance values.

In some embodiments, the processing unit 1006 is further configured to, while enabling display of the control in the respective region of the display unit 1002: detect a change in content that corresponds to the respective region of the display unit from the first content to second content, different from the first content (e.g., with the detecting unit 1012); determine a second set of content-display values, different from the first set of content-display values, for the one or more content-display properties of the second content (e.g., with the determining unit 1008); determine a second set of control-appearance values for one or more control-appearance parameters based on the second set of content-display values, wherein the second set of control-appearance values is different from the first set of control-appearance values (e.g., with the determining unit 1008); and in response to detecting the change in content, change the appearance of the control in accordance with: the second content (e.g., with the changing unit 1014); and the second set of control-appearance values.

In some embodiments, changing the appearance of the control includes changing a color of text in the control.

In some embodiments, the control includes a translucent portion; and changing the appearance of the control in accordance with the second set of control-appearance values includes displaying, in the translucent portion of the control, a representation of a portion of the second content that corresponds to the translucent portion of the control, wherein the representation of the second content is transformed in accordance with the second set of control-appearance values.

In some embodiments, the first set of control-appearance values are values for a first set of control-appearance parameters; and the second set of control-appearance values are values for the first set of control-appearance parameters.

In some embodiments, the first set of control-appearance values are values for a first set of control-appearance parameters; and the second set of control-appearance values are values for a second set of control-appearance parameters different from the first set of control-appearance parameters.

In some embodiments, the processing unit 1006 is further configured to, after detecting the change in content that corresponds to the respective region of the display unit 1002 from the first content to the second content and prior to changing the appearance of the control in accordance with the second set of control display values: determine a respective set of control-appearance values, different from the first set of control-appearance values, for the first set of control-appearance parameters based on the second set of content-display values, wherein the respective set of control appearance values is different from the first set of control-appearance values and the second set of control-appearance values (e.g., with the determining unit 1008); and change the appearance of the control in accordance with: the second content; and the respective set of control-appearance values (e.g., with the changing unit 1014).

In some embodiments, the control includes a translucent portion; a respective portion of content corresponds to a location of the translucent portion of the control; and enabling display of the control in accordance with a respective set of control-adjustment values includes enabling, in the translucent portion of the control, display of a representation of the respective portion of content, wherein the representation of the respective portion of content is transformed in accordance with the respective set of control-appearance values.

In some embodiments, the processing unit 1006 is further configured to, after detecting the change in content from the first content to the second content and before changing the appearance of the control in accordance with the second set of control-appearance values, change the appearance of the control in accordance with: the second content; and the first set of control-appearance values (e.g., with the changing unit 1014).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9E are, optionally, implemented by components depicted in FIGS. 1A-1B or FIG. 10. For example, detection operation 924 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An electronic device, comprising:
 a display;
 one or more processors;
 memory; and
 one or more programs, wherein the one or more programs are stored in the memory and configured to be executed by the one or more processors, the one or more programs including instructions for:
  displaying a user interface on the display;
  determining a first set of content-display values for one or more content-display properties of first content that corresponds to a respective region of the display;
  determining a first set of control-appearance values for one or more control-appearance parameters based on the first set of content-display values; and
  displaying a control in the respective region of the display, wherein an appearance of the control is determined based on:
   the first content; and
   the first set of control-appearance values;
  wherein:
   the control includes a translucent portion; and
   displaying the control includes displaying, in the translucent portion of the control a representation of a portion of the first content that corresponds to the translucent portion of the control, wherein the representation of the first content is transformed in accordance with the first set of control-appearance values.

2. The device of claim 1, wherein a respective content-display value for content in the respective region corresponds to a statistical measurement of a respective visual property for the respective region.

3. The device of claim 1, wherein the content-display properties include one or more of: color, hue, saturation, brightness, and contrast.

4. The device of claim 1, wherein a change in a respective control-appearance value corresponds to a change in a magnitude of a respective transformation that is applied to content underneath the control to generate an appearance of the control.

5. The device of claim 1, wherein the control-appearance parameters include one or more of: blur radius, saturation adjustment, opacity of a white overlay, opacity of a black overlay, opacity of one or more selectable portions of the control, and color of text in the control.

6. The device of claim 1, wherein determining the first set of control-appearance values includes:
  storing a plurality of respective predefined sets of content-display values that correspond to respective predefined sets of control-appearance values;
  identifying one or more predefined sets of content-display values that are close to the first set of content-display values as proximate sets of content-display values; and
  determining the first set of control-appearance values based on one or more predefined sets of control-appearance values corresponding to the one or more proximate sets of content-display values.

7. The device of claim 1, wherein determining the first set of content-display values includes using the first set of content-display values as inputs for an algorithm that generates control-appearance values as output.

8. The device of claim 1, including instructions for, while displaying the control in the respective region of the display:
  detecting a change in content that corresponds to the respective region of the display from the first content to second content, different from the first content;
  determining a second set of content-display values, different from the first set of content-display values, for the one or more content-display properties of the second content;
  determining a second set of control-appearance values for one or more control-appearance parameters based on the second set of content-display values, wherein the second set of control-appearance values is different from the first set of control-appearance values; and
  in response to detecting the change in content, changing the appearance of the control in accordance with:
    the second content; and
    the second set of control-appearance values.

9. An electronic device, comprising:
a display;
one or more processors;
memory; and
one or more programs, wherein the one or more programs are stored in the memory and configured to be executed by the one or more processors, the one or more programs including instructions for:
  displaying a user interface on the display;
  determining a first set of content-display values for one or more content-display properties of first content that corresponds to a respective region of the display;
  determining a first set of control-appearance values for one or more control-appearance parameters based on the first set of content-display values;
  displaying a control in the respective region of the display, wherein an appearance of the control is determined based on:
    the first content; and
    the first set of control-appearance values;
  while displaying the control in the respective region of the display:
    detecting a change in content that corresponds to the respective region of the display from the first content to second content, different from the first content;
    determining a second set of content-display values, different from the first set of content-display values, for the one or more content-display properties of the second content;
    determining a second set of control-appearance values for one or more control-appearance parameters based on the second set of content-display values, wherein the second set of control-appearance values is different from the first set of control-appearance values; and
    in response to detecting the change in content, changing the appearance of the control in accordance with:
      the second content; and
      the second set of control-appearance values.

10. The device of claim 9, wherein changing the appearance of the control includes changing a color of text in the control.

11. The device of claim 9, wherein:
the control includes a translucent portion; and
changing the appearance of the control in accordance with the second set of control-appearance values includes displaying, in the translucent portion of the control, a representation of a portion of the second content that corresponds to the translucent portion of the control, wherein the representation of the second content is transformed in accordance with the second set of control-appearance values.

12. The device of claim 9, wherein:
the first set of control-appearance values are values for a first set of control-appearance parameters; and
the second set of control-appearance values are values for the first set of control-appearance parameters.

13. The device of claim 9, wherein:
the first set of control-appearance values are values for a first set of control-appearance parameters; and
the second set of control-appearance values are values for a second set of control-appearance parameters different from the first set of control-appearance parameters.

14. The device of claim 13, including instructions for, after detecting the change in content that corresponds to the respective region of the display from the first content to the second content and prior to changing the appearance of the control in accordance with the second set of control display values:
  determining a respective set of control-appearance values, different from the first set of control-appearance values, for the first set of control-appearance parameters based on the second set of content-display values, wherein the respective set of control appearance values is different from the first set of control-appearance values and the second set of control-appearance values; and
  changing the appearance of the control in accordance with:
    the second content; and
    the respective set of control-appearance values.

15. The device of claim 9, including instructions for, after detecting the change in content from the first content to the second content and before changing the appearance of the control in accordance with the second set of control-appearance values, changing the appearance of the control in accordance with:

the second content; and the first set of control-appearance values.

16. A method comprising:

at a device with a display:

displaying a user interface on the display;

determining a first set of content-display values for one or more content-display properties of first content that corresponds to a respective region of the display;

determining a first set of control-appearance values for one or more control-appearance parameters based on the first set of content-display values; and displaying a control in the respective region of the display, wherein an appearance of the control is determined based on:

the first content; and the first set of control-appearance values;

wherein:

the control includes a translucent portion; and displaying the control includes displaying, in the translucent portion of the control, a representation of a portion of the first content that corresponds to the translucent portion of the control, wherein the representation of the first content is transformed in accordance with the first set of control-appearance values.

17. The method of claim 16, wherein a respective content-display value for content in the respective region corresponds to a statistical measurement of a respective visual property for the respective region.

18. The method of claim 16, wherein the content-display properties include one or more of: color, hue, saturation, brightness, and contrast.

19. The method of claim 16, wherein a change in a respective control-appearance value corresponds to a change in a magnitude of a respective transformation that is applied to content underneath the control to generate an appearance of the control.

20. The method of claim 16, wherein the control-appearance parameters include one or more of: blur radius, saturation adjustment, opacity of a white overlay, opacity of a black overlay, opacity of one or more selectable portions of the control, and color of text in the control.

21. The method of claim 16, wherein determining the first set of control-appearance values includes:

storing a plurality of respective predefined sets of content-display values that correspond to respective predefined sets of control-appearance values;

identifying one or more predefined sets of content-display values that are close to the first set of content-display values as proximate sets of content-display values; and determining the first set of control-appearance values based on one or more predefined sets of control-appearance values corresponding to the one or more proximate sets of content-display values.

22. The method of claim 16, wherein determining the first set of content-display values includes using the first set of content-display values as inputs for an algorithm that generates control-appearance values as output.

23. The method of claim 16, further comprising:

while displaying the control in the respective region of the display:

detecting a change in content that corresponds to the respective region of the display from the first content to second content, different from the first content;

determining a second set of content-display values, different from the first set of content-display values, for the one or more content-display properties of the second content;

determining a second set of control-appearance values for one or more control-appearance parameters based on the second set of content-display values, wherein the second set of control-appearance values is different from the first set of control-appearance values; and in response to detecting the change in content, changing the appearance of the control in accordance with:

the second content; and the second set of control-appearance values.

24. A non-transitory computer readable storage medium storing one or more programs, the one or more programs comprising instructions, which when executed by an electronic device with a display, cause the device to:

display a user interface on the display;

determine a first set of content-display values for one or more content-display properties of first content that corresponds to a respective region of the display;

determine a first set of control-appearance values for one or more control-appearance parameters based on the first set of content-display values; and display a control in the respective region of the display, wherein an appearance of the control is determined based on:

the first content; and the first set of control-appearance values;

wherein:

the control includes a translucent portion; and displaying the control includes displaying, in the translucent portion of the control, a representation of a portion of the first content that corresponds to the translucent portion of the control, wherein the representation of the first content is transformed in accordance with the first set of control-appearance values.

25. The computer readable storage medium of claim 24, wherein a respective content-display value for content in the respective region corresponds to a statistical measurement of a respective visual property for the respective region.

26. The computer readable storage medium of claim 24, wherein the content-display properties include one or more of: color, hue, saturation, brightness, and contrast.

27. The computer readable storage medium of claim 24, wherein a change in a respective control-appearance value corresponds to a change in a magnitude of a respective transformation that is applied to content underneath the control to generate an appearance of the control.

28. The computer readable storage medium of claim 24, wherein the control-appearance parameters include one or more of: blur radius, saturation adjustment, opacity of a white overlay, opacity of a black overlay, opacity of one or more selectable portions of the control, and color of text in the control.

29. The computer readable storage medium of claim 24, wherein determining the first set of control-appearance values includes:

storing a plurality of respective predefined sets of content-display values that correspond to respective predefined sets of control-appearance values;

identifying one or more predefined sets of content-display values that are close to the first set of content-display values as proximate sets of content-display values; and determining the first set of control-appearance values based on one or more predefined sets of control-appearance values corresponding to the one or more proximate sets of content-display values.

30. The computer readable storage medium of claim 24, wherein determining the first set of content-display values includes using the first set of content-display values as inputs for an algorithm that generates control-appearance values as output.

31. The computer readable storage medium of claim 24, including instructions which, when executed, cause the device to:
while displaying the control in the respective region of the display:
detect a change in content that corresponds to the respective region of the display from the first content to second content, different from the first content;
determine a second set of content-display values, different from the first set of content-display values, for the one or more content-display properties of the second content;
determine a second set of control-appearance values for one or more control-appearance parameters based on the second set of content-display values, wherein the second set of control-appearance values is different from the first set of control-appearance values; and
in response to detecting the change in content, change the appearance of the control in accordance with:
the second content; and
the second set of control-appearance values.

32. A method comprising:
at a device with a display;
displaying a user interface on the display;
determining a first set of content-display values for one or more content-display properties of first content that corresponds to a respective region of the display;
determining a first set of control-appearance values for one or more control-appearance parameters based on the first set of content-display values;
displaying a control in the respective region of the display, wherein an appearance of the control is determined based on:
the first content; and
the first set of control-appearance values;
while displaying the control in the respective region of the display:
detecting a change in content that corresponds to the respective region of the display from the first content to second content, different from the first content;
determining a second set of content-display values, different from the first set of content-display values, for the one or more content-display properties of the second content;
determining a second set of control-appearance values for one or more control-appearance parameters based on the second set of content-display values, wherein the second set of control-appearance values is different from the first set of control-appearance values; and
in response to detecting the change in content, changing the appearance of the control in accordance with:
the second content; and
the second set of control-appearance values.

33. The method of claim 32, wherein changing the appearance of the control includes changing a color of text in the control.

34. The method of claim 32, wherein:
the control includes a translucent portion; and
changing the appearance of the control in accordance with the second set of control-appearance values includes displaying, in the translucent portion of the control, a representation of a portion of the second content that corresponds to the translucent portion of the control, wherein the representation of the second content is transformed in accordance with the second set of control-appearance values.

35. The method of claim 32, wherein:
the first set of control-appearance values are values for a first set of control-appearance parameters; and
the second set of control-appearance values are values for the first set of control-appearance parameters.

36. The method of claim 32, wherein:
the first set of control-appearance values are values for a first set of control-appearance parameters; and
the second set of control-appearance values are values for a second set of control-appearance parameters different from the first set of control-appearance parameters.

37. The method of claim 32, including: after detecting the change in content that corresponds to the respective region of the display from the first content to the second content and prior to changing the appearance of the control in accordance with the second set of control display values:
determining a respective set of control-appearance values, different from the first set of control-appearance values, for the first set of control-appearance parameters based on the second set of content-display values, wherein the respective set of control appearance values is different from the first set of control-appearance values and the second set of control-appearance values; and
changing the appearance of the control in accordance with:
the second content; and
the respective set of control-appearance values.

38. The method of claim 32, including: after detecting the change in content from the first content to the second content and before changing the appearance of the control in accordance with the second set of control-appearance values, changing the appearance of the control in accordance with:
the second content; and
the first set of control-appearance values.

39. A non-transitory computer readable storage medium storing one or more programs, the one or more programs comprising instructions, which when executed by an electronic device with a display, cause the device to:
display a user interface on the display;
determine a first set of content-display values for one or more content-display properties of first content that corresponds to a respective region of the display;
determine a first set of control-appearance values for one or more control-appearance parameters based on the first set of content-display values;
display a control in the respective region of the display, wherein an appearance of the control is determined based on:
the first content; and
the first set of control-appearance values;
while displaying the control in the respective region of the display:
detect a change in content that corresponds to the respective region of the display from the first content to second content, different from the first content;

determine a second set of content-display values, different from the first set of content-display values, for the one or more content-display properties of the second content;

determine a second set of control-appearance values for one or more control-appearance parameters based on the second set of content-display values, wherein the second set of control-appearance values is different from the first set of control-appearance values; and in response to detecting the change in content, change the appearance of the control in accordance with:
  the second content; and
  the second set of control-appearance values.

40. The computer readable storage medium of claim 39, wherein changing the appearance of the control includes changing a color of text in the control.

41. The computer readable storage medium of claim 39, wherein:
  the control includes a translucent portion; and
  changing the appearance of the control in accordance with the second set of control-appearance values includes displaying, in the translucent portion of the control, a representation of a portion of the second content that corresponds to the translucent portion of the control, wherein the representation of the second content is transformed in accordance with the second set of control-appearance values.

42. The computer readable storage medium of claim 39, wherein:
  the first set of control-appearance values are values for a first set of control-appearance parameters; and
  the second set of control-appearance values are values for the first set of control-appearance parameters.

43. The computer readable storage medium of claim 39, wherein:
  the first set of control-appearance values are values for a first set of control-appearance parameters; and
  the second set of control-appearance values are values for a second set of control-appearance parameters different from the first set of control-appearance parameters.

44. The computer readable storage medium of claim 39, including instructions which, when executed, cause the device to: after detecting the change in content that corresponds to the respective region of the display from the first content to the second content and prior to changing the appearance of the control in accordance with the second set of control display values:
  determine a respective set of control-appearance values, different from the first set of control-appearance values, for the first set of control-appearance parameters based on the second set of content-display values, wherein the respective set of control appearance values is different from the first set of control-appearance values and the second set of control-appearance values; and
  change the appearance of the control in accordance with:
    the second content; and
    the respective set of control-appearance values.

45. The computer readable storage medium of claim 39, including instructions which, when executed, cause the device to: after detecting the change in content from the first content to the second content and before changing the appearance of the control in accordance with the second set of control-appearance values, change the appearance of the control in accordance with:
  the second content; and
  the first set of control-appearance values.

* * * * *